: US 10,701,005 B2
(45) Date of Patent: *Jun. 30, 2020

(12) United States Patent
Nutt et al.

(54) MANAGEMENT OF DYNAMIC EMAIL CONTENT

(71) Applicant: Movable, Inc., New York, NY (US)

(72) Inventors: Michael Nutt, New York, NY (US); Vivek Sharma, Brooklyn, NY (US)

(73) Assignee: Movable, Inc., New York, NY (US)

( * ) Notice: Subject to any disclaimer, the term of this patent is extended or adjusted under 35 U.S.C. 154(b) by 200 days.

This patent is subject to a terminal disclaimer.

(21) Appl. No.: 16/012,710

(22) Filed: Jun. 19, 2018

(65) Prior Publication Data
US 2018/0302355 A1 Oct. 18, 2018

Related U.S. Application Data

(63) Continuation of application No. 15/786,348, filed on Oct. 17, 2017, now Pat. No. 10,027,610, which is a continuation of application No. 14/273,103, filed on May 8, 2014, now abandoned, which is a continuation of application No. PCT/US2012/064498, filed on Nov. 9, 2012.

(60) Provisional application No. 61/557,614, filed on Nov. 9, 2011.

(51) Int. Cl.
H04L 12/58 (2006.01)
G06Q 10/10 (2012.01)

(52) U.S. Cl.
CPC ......... H04L 51/046 (2013.01); G06Q 10/107 (2013.01)

(58) Field of Classification Search
None
See application file for complete search history.

(56) References Cited

U.S. PATENT DOCUMENTS

| 6,310,301 | B1 | 10/2001 | Moore |
| 6,775,678 | B1 | 8/2004 | Hillberg |
| 2003/0221167 | A1 | 11/2003 | Goldstein et al. |
| 2004/0045030 | A1 | 3/2004 | Reynolds et al. |
| 2004/0148565 | A1* | 7/2004 | Davis .................. G06F 17/3089 |
| | | | 715/205 |
| 2004/0153371 | A1 | 8/2004 | Razumov |
| 2004/0215479 | A1 | 10/2004 | Dorsey |
| 2005/0149626 | A1 | 7/2005 | Manchester et al. |
| 2006/0106937 | A1 | 5/2006 | Shields et al. |
| 2007/0005762 | A1 | 1/2007 | Knox |

(Continued)

FOREIGN PATENT DOCUMENTS

| EP | 1049031 B1 | 9/2008 |
| EP | 2101272 A1 | 9/2009 |

(Continued)

Primary Examiner — Wing F Chan
Assistant Examiner — Billy H Ng
(74) Attorney, Agent, or Firm — DLA Piper LLP (US)

(57) ABSTRACT

Systems and methods to manage dynamic content in email via an image server. The image server being configured to communicate and receive requests from an email client regarding dynamic content. The image server is also configured to load data regarding the email client from an asset database, and to communicate with a decision engine. Further, the image server is configured to communicate with a content acquisition server, to communicate an analytics database, and to cause display of dynamic content in an email.

20 Claims, 23 Drawing Sheets

(56) References Cited

U.S. PATENT DOCUMENTS

| | | |
|---|---|---|
| 2007/0112920 A1 | 5/2007 | Hay |
| 2007/0118521 A1 | 5/2007 | Jatowt |
| 2007/0186252 A1 | 8/2007 | Maggio |
| 2007/0204064 A1 | 8/2007 | Mail |
| 2007/0208704 A1 | 9/2007 | Ives |
| 2007/0299853 A1 | 12/2007 | Knotz |
| 2009/0030991 A1 | 1/2009 | Vakkalanka |
| 2009/0069931 A1 | 3/2009 | Peters et al. |
| 2010/0042592 A1 | 2/2010 | Stolz et al. |
| 2010/0054600 A1* | 3/2010 | Anbalagan ............ G06Q 10/10 382/180 |
| 2010/0091330 A1 | 4/2010 | Marchesotti |
| 2010/0106788 A1* | 4/2010 | Lynn ................... G06Q 10/107 709/206 |
| 2010/0299676 A1 | 11/2010 | Lopez |
| 2011/0066692 A1 | 3/2011 | Ciancio-Bunch |
| 2011/0131106 A1 | 6/2011 | Eberstadt et al. |
| 2011/0179362 A1* | 7/2011 | Craddock ............... H04L 51/08 715/752 |
| 2011/0231240 A1 | 9/2011 | Schoen et al. |
| 2011/0238524 A1 | 9/2011 | Green |
| 2012/0011196 A1* | 1/2012 | Green ................. G06Q 10/107 709/203 |
| 2012/0042025 A1 | 2/2012 | Jamison |
| 2013/0117380 A1* | 5/2013 | Pomazanov ......... G06Q 10/107 709/206 |

FOREIGN PATENT DOCUMENTS

| | | |
|---|---|---|
| WO | WO 2001/04784 A2 | 1/2001 |
| WO | WO 2009/036190 | 3/2009 |

\* cited by examiner

Riverview /— 705
$40 to Spend on Food and Drink

710 —— $20  [ Buy Now ] /— 715

718

720 —— There are 443 people in the deal

725 —— 2 days 4 hours 32 minutes 51 seconds remaining!

Example Details of a Deal such as /— 730
price, timing, etc.

735 —— Learn More »

BRANDS

Robert Rodriguez — 830A
Kelsi Daggar — 830B
ABCMAXAZRIA Handbags & Shoes — 830C

Large Pillow Case ~ 950

This magnificent pillow case will make you sleep like a dream.

Only 4 Left! ~ 960

Checkins From Your Friends

Latest Tweets

Friends who are attending:

1140

OK, count on me

1150

SSW Afterparty

1160

INFORMATION ABOUT THE ENVENT

12 DAYS UNTIL THE NEW YEAR!

MANAGEMENT OF DYNAMIC EMAIL CONTENT

CROSS REFERENCE TO RELATED CASES

This patent application claims priority to and is a continuation of U.S. Utility patent application Ser. No. 15/786,348 filed on 17 Oct. 2017, which itself claims priority to and is a continuation of Ser. No. 14/273,103 filed on 8 May 2014, which itself claims priority to and is a continuation of international patent application No. PCT/US 12/64498 filed 9 Nov. 2012, which itself claims priority to U.S. provisional patent application No. 61/557,614 filed 9 Nov. 2011, all of which are herein incorporated by reference in their entirety.

FIELD

The technology described in this patent document relates to providing and managing real-time dynamic content in emails.

SUMMARY

A system and method to manage dynamic content in email comprising at least one image server configured to communicate with at least one email client, receive requests from the at least one email client regarding dynamic content, load data regarding the at least one email client from at least one asset database, communicate with at least one decision engine, communicate with at least one content acquisition server, communicate with at least one analytics database, and cause display of dynamic content in at least one email.

Further, the systems and methods could include an example where the at least one request from the email client includes requests for dynamic emails. And they may include examples where the at least one asset database is configured to receive, store and transmit data regarding images for use in the dynamic emails.

Another embodiment may include aspects where the data regarding images for use in the dynamic emails includes at least one of: client data, requested assets, images kinds, rules to apply, and content source locations. Still another example could include where the decision engine is configured to determine and send to the image server information about content source base on at least one of: asset settings, location, time, creative optimization objects, geo-location applications, third party data, device type inferences, and custom business rules.

An embodiment may also include where the at least one content acquisition server is chosen from a list of a capture server, a static server and an overlay server. It could also include an implementation where the capture server is configured to capture at least a portion of a web page. Still another embodiment may have the static server is configured to cause display of a regular image.

Yet another example embodiment may include an implementation where the overlay server is configured to overlay at least one image onto another image and flatten the resulting image. Another example could include an example where the analytics database is configured to receive and transmit data regarding at least one of time, location, and user data. Still another embodiment could entail where the image server is further configured to receive geographic location from at least one of a user IP address and a user GPS coordinate.

Further examples could include the systems and methods detailed here wherein the capture server is further configured to locate and identify links in content source images. The systems and methods could also include, for example, implementations where the capture server is further configured to modify at least one image and return the modified image to the image server, wherein modify includes at least one of: crop image, distort image, and tag image.

Some example embodiments could include embodiments where cropping an image includes at least loading the content source, crop the image, identify any HyperText Markup Language (html) tags, crop the html tags, locate coordinates and dimensions of any links within the content source. They may also include embodiments where the analytics database is configured to receive, store, and transmit data associated with email actions including at least one of, email opening, email closing, time of email viewing, time of email viewing, email clicking, email forwarding, email printing, location of user at time of email viewing, social cues, fast-moving inventory, and custom business rules.

Some other example embodiments may also include implementations where the analytics database is configured to receive, store and transmit data regarding whether the receiving user is a first time user or unique user. Another example could be example implementations where the analytics database is configured to aggregate data based on time, location, and company.

Further example embodiments may also include implementations where the dynamic email content includes at least one hyperlink. They could also include examples where the at least one hyperlink directs traffic to a redirect engine, configured to communicate to the image server and transmit information regarding the updated link. And further still, wherein the image server is further configured to store the updated link and allow the redirect engine to reroute traffic to the most updated link. And implementations may also include, for example, where underlying links in a dynamically rendered web page are used to determine updates to the link.

Some examples may also include implementations where the content of the email is able to be resized and rearranged. Other examples may also include where the content of the email includes a subsection adapted to cause display of modifications of the content including at least one of cropping, resizing, deleting, partitioning and adjust the image.

Exemplary implementations consistent with the disclosures here may include examples where the image server is further configured to receive information regarding the device used to open an email to allow viewing of the dynamic content. They may also include wherein the received information is a string that uniquely identifies the name and version of the email client. Still another example may have the image server further configured to cause storage of the received information regarding the device in the analytics database.

Another example consistent with the examples in this disclosure may include implementations that may have the image server further configured to receive information regarding a device used to open an email including information regarding whether the device is a mobile device. An example may also have the image server further configured to adapt the dynamic content to a mobile device format. Yet another may be where the adapted dynamic content relate to at least one of, an image, text font, resolution, call to action, and advertising.

Further examples may include embodiments where the content acquisition server is a capture server, configured to load dynamic web pages and render them for use in emails.

Other embodiments could also have the capture server further configured to send information to the dynamic web page, including information regarding at least one of, a device used to open an email, and a location of the device used to open an email. Still another example here could include wherein the information is sent in the form of a query parameter in the web page URL.

Yet another example embodiment here could have the dynamic content include at least one of, breaking news, a tweet, a blog entry, a content update.

A further example embodiment may have the dynamic content include at least a timer. In this example, the timer could indicate the time remaining before an advertising offer expires. This example may further continue where the image server is further configured to restrict access to a link, at the expiration of the timer.

Another example implementation may include where the dynamic content includes information regarding other users who have received similar dynamic content. This embodiment could then have where the other users and the email recipient are socially networked to one another via a third party social network. Further, it could have the other users and the email recipient share similar interests.

An implementation consistent with this disclosure may also include examples where the dynamic content includes information regarding an event. It may also include where the information regarding an event includes at least one of updates to event information, comments related to the event, and updated RSVP information.

And another example embodiment could include the systems and methods here where the dynamic content includes information about inventory. In light of this embodiment, the inventory information could also include at least one of, updated inventory numbers, inventory location, and calculated future inventory estimates. Further, the image server could be further configured to communicate with a site to calculate inventory, cause display of a comparable product/service in an email if inventory if a particular item is low, and re-direct access attempts to the comparable product/service.

DETAILED DESCRIPTION

Figure 1:
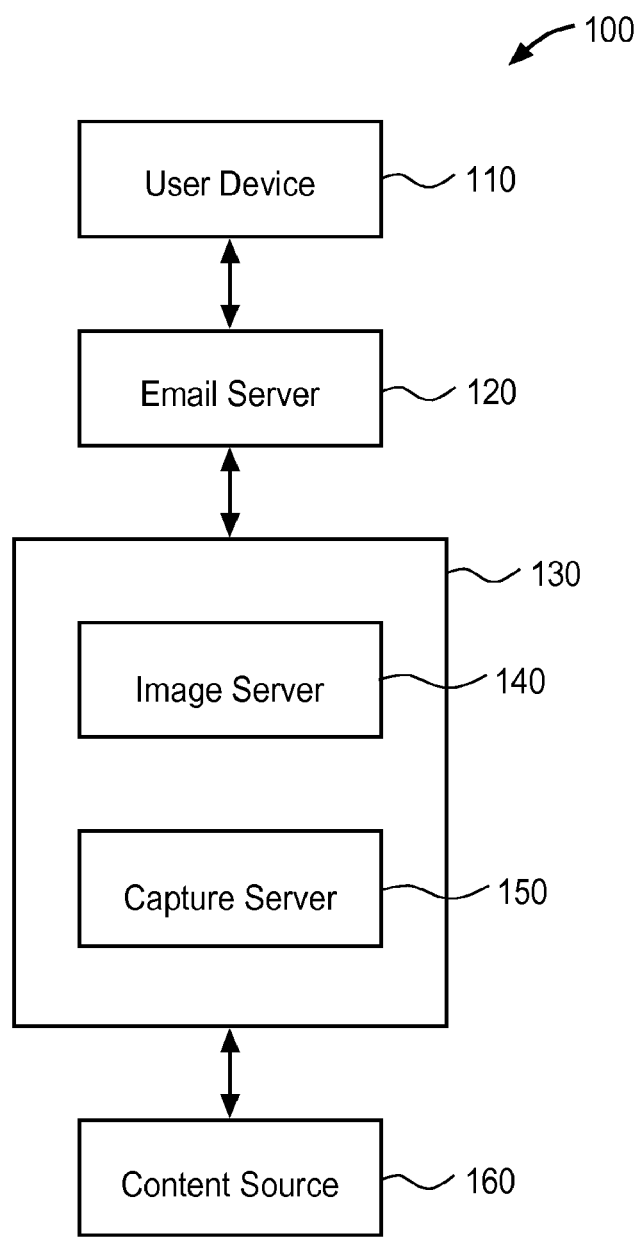
FIG. 1 illustrates a high level and simplistic system according to the disclosed technology.

In the following detailed descriptions, numerous specific details are set forth to illustrate the subject matter presented in this document. It will, however, be apparent to one of ordinary skill in the art that the subject matter may be practiced without these exact specific details. Moreover, the descriptions are provided by way of example and should not be used to limit the scope of any later claimed inventions.

Overview

Content delivery tools such as email are used worldwide as communication tools, with established benefits such as marketing channels. Information can be sent to a virtually unlimited number of current and prospective customers immediately and simultaneously via email. And now, emails are commonly used to deliver static content, such as images, text, links to web pages, attachments, and the like.

This is made possible by various computer networks, that link end user computing machines to one another. These networks can be either local or wide area networks. They can also connect user machines via land lines or mobile devices as well.

However, email, in its current state, has significant limitations as a marketing tool. For example, the rates at which people are opening marketing emails is in decline. It is very difficult to generate millions of variations of creative content to effectively target subscribers, email campaigns begin to go stale very quickly after they are sent out, and subscribers cannot interact with the email content in a manner that optimizes the content.

Thus, the disclosed technologies relate to delivering dynamic content via email, over computer networks. Types of dynamic content which are deliverable by email utilizing the disclosed technologies include, but are not limited to, dynamic images, dynamic advertisements, dynamic text (i.e. blog/forum discussions, social media posts, etc.), website updates (i.e. news, sports, stocks, etc.), streaming video or animations, and the like. Dynamic here may mean any number of things including moving, animated, linked, audio, changing, or the like.

The inventive aspects here enable email to be delivered dynamically, content to be automatically generated when the email itself is opened, thereby creating a web-like experience, and optimize content of an email based on feedback or interactions by the email recipient or other subscriber. In addition, the inventive aspects here enable dynamic emails that can allow companies to collect advanced analytic data based on distributed emails, such as data relating to the time read of an email, whether the email was forwarded or otherwise distributed, whether the email was printed, and the like.

While the disclosed technologies are described with reference to an exemplary implementation using emails, the disclosed technologies could also be implemented using any suitable content delivery method, for example, content delivery methods utilizing html. Furthermore, the disclosed technology can be implemented without requiring the use of client side plugins or other software, and works across all email clients, for example, Gmail, Outlook, iPhone, Yahoo, or any other email client.

Dynamic Content in Emails

According to the disclosed examples, an email including dynamic content is delivered to a user. Specifically, the email acts as a container for live, dynamic content. For example, the content can be embedded as an image into the email, such as an image map, or a plurality of images. Images can also be embedded within specific subsections within the email, if desired. Any type of content can be embedded into the email as a part of the embedded image or images, including, for example, images, text, links, and the like. In addition, many different types of content can be embedded simultaneously into an email as a single image or as multiple images. For example, a single embedded image can include any combination of links, images, text, Twitter updates, etc.

When the user opens or refreshes an email, the content within the email is updated. In addition, the content can be modified based on a variety of factors, such as time of open, recipient's current location, social cues, fast-moving inventory, custom business rules, and the like.

Figure 2:
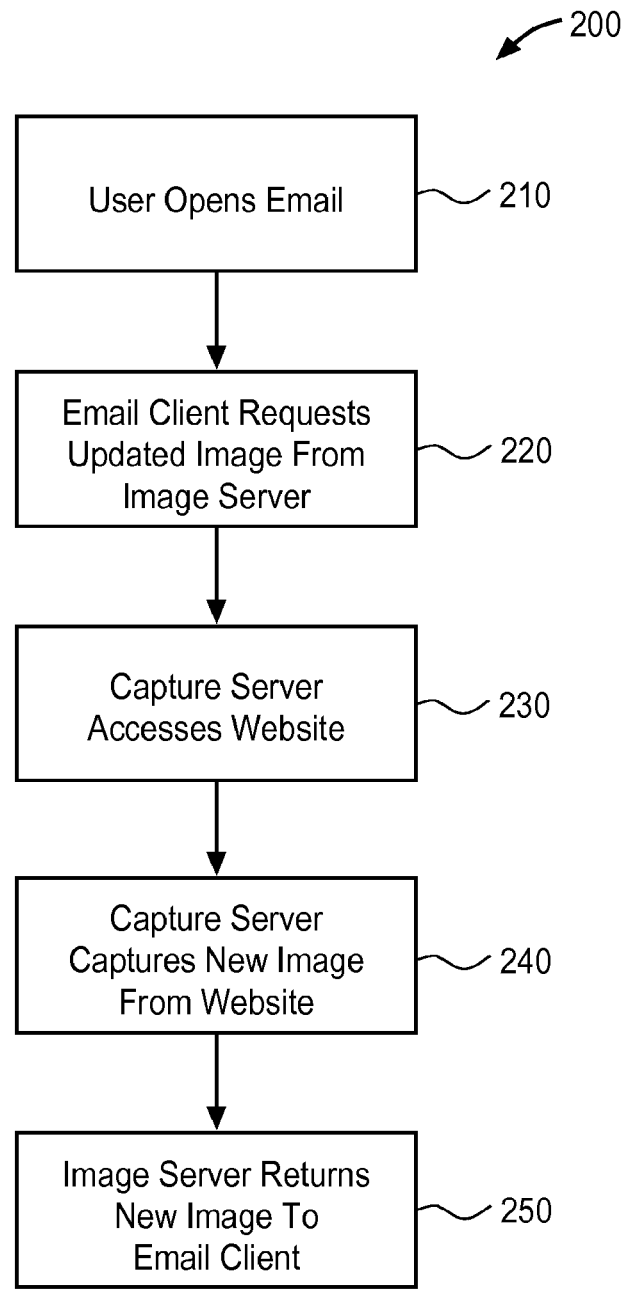
FIG. 2 illustrates a general method according to the system shown in FIG. 1.

One technique for doing this is to capture or collect dynamic web content and translate that content into an image in real-time and in a scalable way. FIG. 1 illustrates a high level and simplistic system 100 according to the disclosed technology. In FIG. 1, system 100 includes a user device 110, an email server 120, a dynamic content management system 130, and a content source 160. The dynamic content management system 130 includes at least an image server 140 and a capture server 150 in this example. As shown in FIG. 2, which illustrates a general example method 200 according to the system of FIG. 1, when an email is opened or refreshed in step 210, the email client (via email server 120) can request an updated image from image server 130 in step 220. Capture server 150 can then load the content source 160 in step 230 and capture the updated image in step 240. Content source 160 can be any suitable content source, such as a source website, which should have the most current version of the content. Image server 140 can then return the updated image to the email client via email server 120, and the updated image is displayed in the email on user device 110. If necessary, the updated image can be cropped otherwise modified to optimize presentation within the email. And the Image Server may return the new image to email client 250.

When multiple images are embedded in an email, for example, in one or more subsections of the email, one or more of the images can be updated when the user opens or refreshes the email. Specifically, when the email is refreshed, the image server can provide updated content for any or all of the images or subsections of the email.

The details surrounding how each item of content is embedded into the email can be specified using an embed code, which can be inserted into the email template for distribution using any suitable means, such as, copy and paste. In typical implementations, embed codes can be developed using HTML fragments, and preferably include one or more image tags that are associated with links, for example. Image tags can be HTML elements that display graphical content in HTML. They generally consist of a tag ("<img") and a source, which stores a URL referencing where the image is stored. When a browser encounters an image tag, the image can be retrieved from the source and displayed. Image tags can likewise be utilized to create dynamic emails by moving the dynamic content generation from an embedded attachment within the email to the image server, for example, and referencing it with an image tag.

The location or position of each item or instance of content within the embedded image can be based on any relevant characteristic including, for example, coordinates within the image. Image coordinates can be utilized on both the server-side and the client-side. When used on the server-side, image coordinates are typically X,Y coordinates that are generated based on an image or other content that was presented to a user. Specifically, X,Y coordinates can be mapped to specific features presented to the user. When used on the client-side, image coordinates can be assigned to specific items of content (e.g. links or other clickable regions), and specified in embed code. The embed code can also include other characteristics of the relevant items of content such as an offset such as X, Y, or top, left for example, width, height, and the URL that the content targets. In this manner, when the email is presented to the user, and the user clicks on a clickable region, such as a link or other object within an embedded image, the location of the click can be determined using the image coordinates (i.e. X,Y coordinates) on a server-side image map, and the resulting action can be re-routed as appropriate to the target of the link corresponding to the location of the click. For example, if a user clicks on a link within an embedded image that is a link to a website, the click action will be received by an image server, the image server will identify the location of the click based on the coordinates of the click action within the embedded image, identify the target of the link positioned at that location, and re-route the user to the target page. Thus, despite the fact that the user did not click on an actual link to the website, the user can be seamlessly re-directed to the target of the link within the embedded email by the image server, for example.

Figure 3:
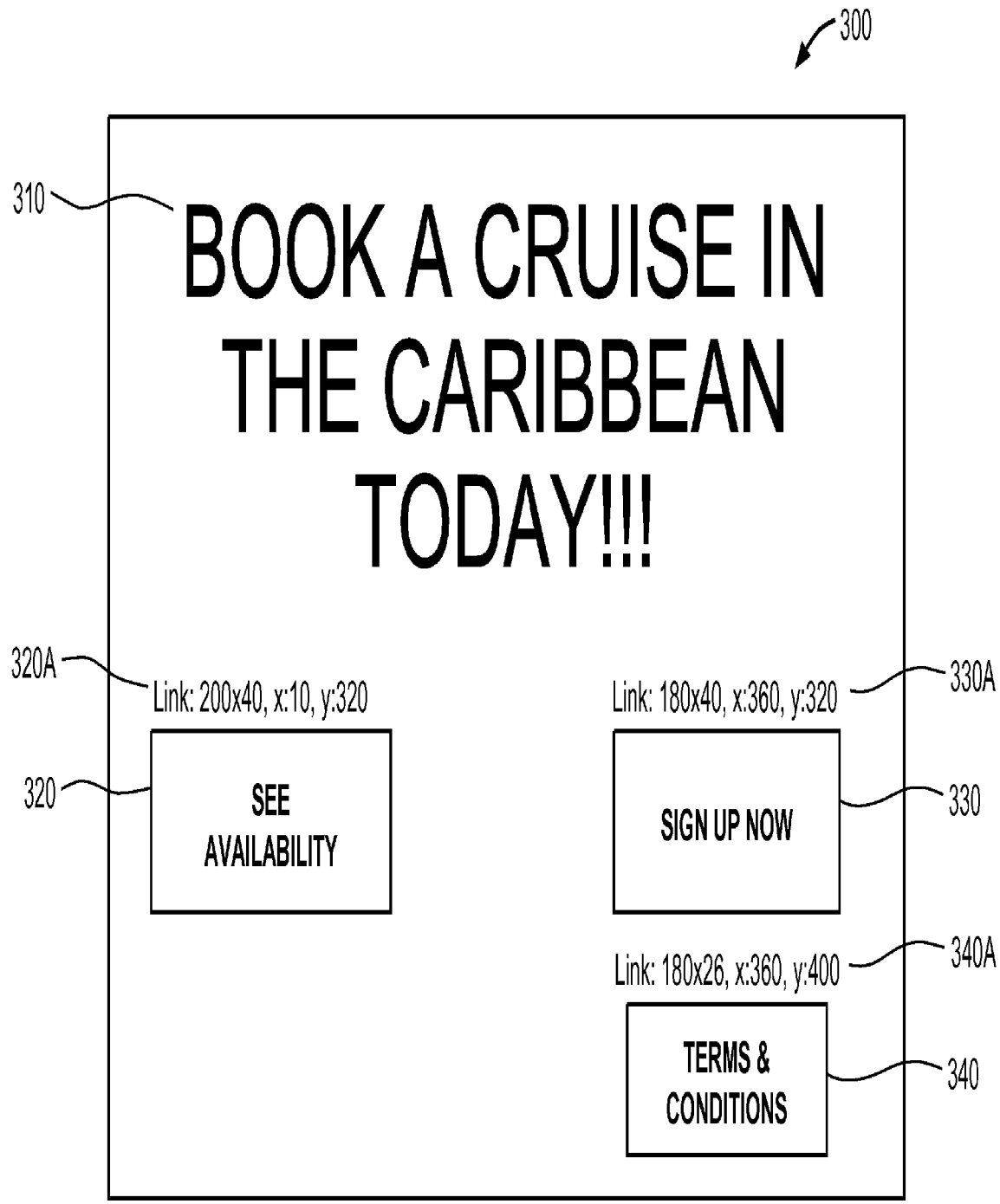
FIG. 3 illustrates an exemplary image map according to the disclosed technology.

As described herein, when the user loads a dynamic image with an image map enabled, the capture server finishes rendering the dynamic page then finds all of the links on the page. It does this by querying the Document Object Model (DOM) to select all tags that are of type "a" (links). Referring to FIG. 3, an image 300 may include information regarding the location of some of the content. Image 300 may include, for example, a title 310, such as "BOOK A CRUISE IN THE CARIBBEAN TODAY!!!," and also include a variety of links associated with content, such as "SEE AVAILABILITY" link 320, which has location information 320A, "SIGN UP NOW" link 330, which has location information 330, and "TERMS & CONDITIONS" link 340, which has location information 340A. Location information 320A, 330A, and 340A can include information regarding the target of the link (e.g. URL), the size of the link, and the position of the links within image 300. For example, as shown in FIG. 3, location information 320A may specify that "SEE AVAILABILITY" 320 has a target of "http://example.com/availability" with a width of 200, a height of 40, an x-offset of 10, and a y-offset of 320, location information 330A may specify that "SIGN UP NOW" 330 has a target of "http://example.com/signup" with a width of 180, a height of 40, an x-offset of 360, and a y-offset of 320, and location information 340A may specify that "TERMS & CONDITIONS" 340 has a target of "http://example.com/terms" with a width of 180, a height of 26, an x-offset of 360, and a y-offset of 400.

When the capture server returns the image to the image server, it appends the location of the links in the header. The image server then stores these links based on {image id, user id} and returns the image to the email client. When the user clicks on the image, the user is sent to a redirect server. Since the image tag has an "ismap" attribute, the email client appends the coordinates X,Y to the URL, where X and Y are the coordinates of the click on the image. The redirect server loads the list of links from its database based on {image id, user id}. It iterates through each link and does a test to see if the X,Y coordinates fall inside of the box defined by the stored image map. Once it finds one, it redirects the user to that link. If none of the links match, it redirects the user to a default link specified by the content source.

Figure 4:
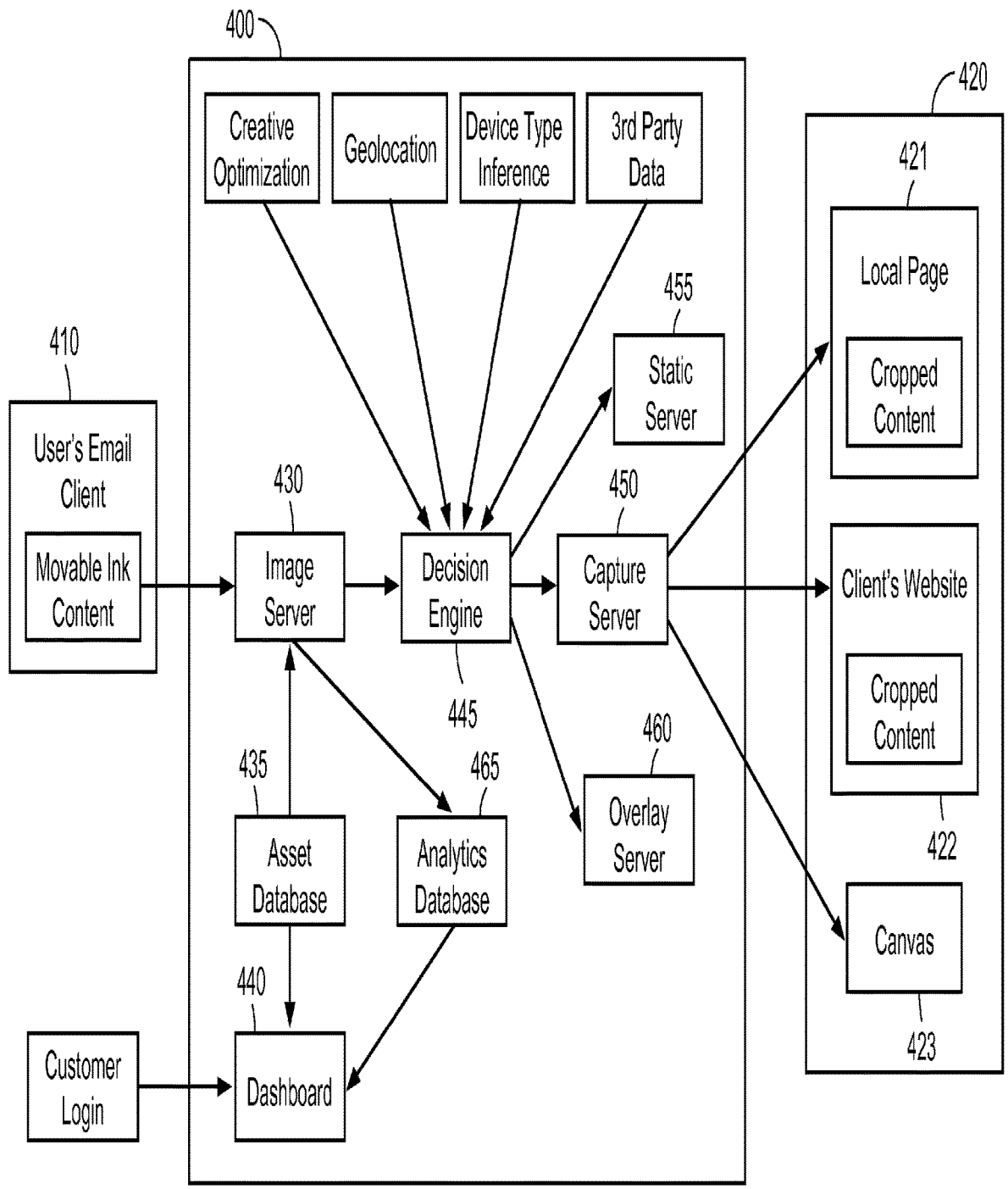
FIG. 4 illustrates various exemplary components of the system according to the disclosed technology.

FIG. 4 is a more detailed diagram illustrating various exemplary components of the system according to the disclosed technology. Specifically, FIG. 4 illustrates the overall system including interactions between at least three different entities: the user's email client 410, which may also refer to the user device, a content source 420 (i.e. webpage, local page, canvas, etc.), and the dynamic content management system 400 of the disclosed technology.

Referring again to FIG. 4, the user's email client 410 provides emails to the subscribers or users for display on user devices. Any email client is capable of utilizing the dynamic features described herein as the disclosed features are embedded within the emails, and thus, are compliant with all known email standards and are designed, in most cases, to work across every mail client. No additional usage of Javascript, plugins, etc. is required.

Dynamic content management system 400 preferably includes a multitude of components, including image server 430, asset database 435, dashboard 440, decision engine 445, capture server 450, static server 455, overlay server 460, and analytics database 465. While FIG. 4 illustrates these components within dynamic content management system 400, it should be understood that one or more of the components may be located remotely relative to the other components. Further, not all of these components are necessarily needed for the system to operate effectively. For instance, the Capture Server, 450, Static Server 455 and the Overlay Server 460 are all shown within this example system, but they are only needed if their operations are needed to cause display of specific dynamic content.

Image server 430 preferably communicates with the user's email client 410. Image server 430 can be configured to carry out many important functions. For example, image server 430 receives an initial request from the customer's email program (via email client 410) to initiate the process of developing the emails with dynamic content as described herein. In addition, image server 430 loads data about the client and the requested assets from the necessary databases, such as asset database 435. Asset database 435 preferably stores asset properties, such as information regarding what kinds of images are used, what rules should be applied, where the dynamic content sources are located, and the like. In operation, when email client 410 requests a dynamic image, asset database 435 can provide asset information to image server 430 as needed. Image server 430 also pulls in other data from any other sources including, for example, geo-location data from the user's IP address, GPS, etc., the device type being used by the user and the target subscribers, third party data, such as demographics like age group, gender, etc., and the like. Based on the information it receives, image server 430 preferably determines what content is to be updated and any additional information about the content, for example, image size, source, etc.

Image server 430 can also make decisions using decision engine 445 regarding which content source 420 to use based on the collected data and other factors, such as asset settings, location, time, and the like. Other factors considered by image server 430 and decision engine 445 include creative optimization objectives, geo-location applications, 3$^{rd}$ party data, device type inferences, custom business rules, and the like. During the content acquisition process, image server 430 interfaces or communicates with one or more content acquisition servers such as a capture server 450, static server 455, and overlay server 460, as appropriate. Image server 430 interfaces with capture server 450 if the requested content involves capturing a web page or a portion of a web page, static server 450 if the requested content involves the display of a regular image, and overlay server 460 if the requested content involves taking a base image, applying one or more overlay images to it, and flattening the resulting image. Image server 430 also reports data relating to a variety of issues to analytics database 465, such as time, location, user data, and the like.

As indicated above, capture server 450 is used to capture a web page or a portion of a web page, for example. More specifically, capture server 450 loads or renders content from content source 420, such as a client or other website 422, a local page 421, a canvas 423, and the like. Thus, content sources 420 are accessed to obtain the latest instances of the dynamic content for presentation in the emails. When capturing the content, capture server 450 can also be configured to parse the content source and render the content into html. The content capture server 450 collects can be rendered into an image for delivery to the image server. Any content source 420 can be used provided the dynamic content management system 400 is capable of accessing the updated versions of the content as needed. Capture server 450 can also receive additional parameters, such as size, time, location, device type, third party data, and the like, from image server 430, and provide this information to content source 450.

Client websites 422 can include any pages that the client runs or modifies. Local pages 421 can include any pages that a client can edit or otherwise modify through a dashboard, for example, using a What You See is What You Get (WYSIWYG) editor or by modifying the .html directly. Canvases 423 are blank images that can be freely edited with shapes, text, images, and the like. Canvases 423 are generally not as flexible as web pages, but offer a different approach as desired. For example, HTML is generally document and stylesheet based while canvases are bitmap-based, which means that canvases can be modified using individual pixels. Thus, canvases can be used to display content that is dynamic and graphical, for instance, a chart.

It is preferable that content source 420 be configured such that it can be rendered immediately, as needed. Capture server 450 can also locate and identify links in content sources 420 and their respective coordinates. Capture server 450 is further used to crop or distort images, if necessary, to a specified tag, if it is present, or based on any asset settings, and return the cropped image to image server 430. When cropping an image, capture server 450 preferably loads the content source 420, crops the image as needed, identifies any .html tags and crops them, as needed, and locates the coordinates and dimensions of any links within the content source 420.

While image server 430, capture server 450, static server 455, and overlay server 460 are described above as separate servers, a single server may be used to carry out the functions of two or more of these servers.

Analytics database 465 stores a variety of data, including data associated with actions related to the emails, such as when the user opens the email, when the user closes the email or moves on to the next email, when the user clicks on the email, when the user forwards the email, when the user prints the email, and the like, as well as data related to time of open, recipient's current location, social cues, fast-moving inventory, and custom business rules. Analytics database 465 also serves to determine whether instances of access to an email are first-time or unique users, and which are existing users that are simply access the content again. Analytics database 465 further aggregates data by time, location, company, and the like. The information stored within analytics database 465 is generally collected while the email is being viewed, and can be later used when a user requests a report, for example.

Streaming Dynamic Content

In addition to the presentation of updated images or other dynamic content when an email is opened or refreshed, streaming content can be also be displayed in real-time in emails, including timers, videos, animations, and the like, without requiring the email to be refreshed. Specifically, this feature allows businesses to stream live content into emails while the emails are open. Any type of streaming dynamic content can be rendered in this manner, for example, real-time stock quotes, commercials, program episodes, news, weather, etc. Streaming content can also be presented using animated files types, such as .gifs and the like. While some types of streaming dynamic content can be predetermined and predicted (i.e. timers, calendars, etc.), many types are not predictable. In this regard, streaming content can be captured from web pages such as web pages that are powered by technologies such as AJAX, Flash, and the like. These technologies can be used in systems in which, when a particular operation is delayed, such as loading a specific item of content, the servers can continue working on other operations. Thus, asynchronous event-based servers can be used to simultaneously manage multiple requests. Likewise, when presenting streaming content, one operation may be related to a constant data stream associated with the streaming content, so using multiple requests is preferred.

The display of streaming or real-time content in emails can be accomplished, for example, by using a x-mixed-replace approach. In x-mixed-replace, periodically updated images can be provided to the email client and displayed in an email frame-by-frame. To optimize the streaming content, new instances of the updated images are preferably provided very rapidly to yield a fluid real-time display of the content in the email. Any refresh time interval can be used with this technique. It is also possible to request a new version of the content as soon as the prior version is provided, thereby yielding a very fluid display of the real-time content. X-mixed-replace is described below.

Exemplary uses of streaming content include receiving an email from a finance website and seeing stock prices move up and down as the market shifts, recreating the urgency and dynamics of a real-world sample sale by showing which products are selling out right now, showing streaming tweets as news is breaking in real-time, and the like. The content is always up-to-date as the content is being pulled directly from the content source.

X-Mixed-Replace

X-Mixed-Replace is a specification that allows browsers to receive a response, then later receive updates for that same response. When used with images, the browser renders the original image sent, then when the server sends new images the browser replaces the old image with the new image. With streaming content, the email client opens a page and establishes a connection to the image server, which establishes a connection to the capture server. The capture server responds with a special header, which is passed back to the client. (e.g. Content-Type: multipart/x-mixed-replace; boundary=_divider_). The "boundary" is an arbitrary string that will be used to denote the boundary between images. Whenever the email client sees "_divider_" on a line by itself, it will know that a new update is arriving and it should redraw the image. The connection is held open as long as new updates are being sent, until the email client terminates the connection (when the user moves on to a new image) or optionally the back end can set a timeout, after which no new images are sent and the connection is closed.

Figure 5:
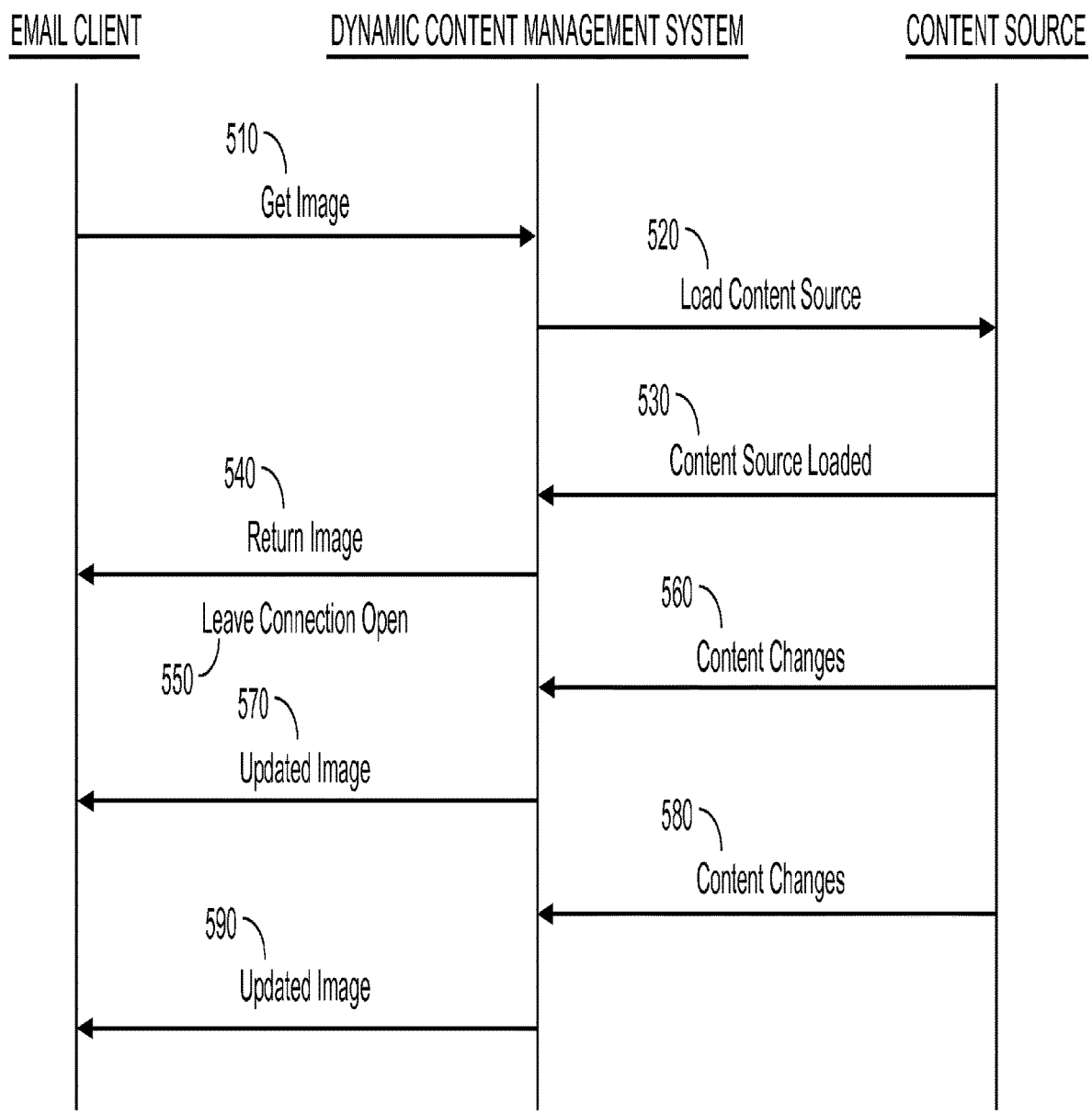
FIG. 5 illustrates an exemplary content flow between the email client, the dynamic content system, and the content source according to the disclosed technology.

FIG. 5 illustrates an exemplary content flow between the email client, the dynamic content system, and the content source according to the disclosed technology. Specifically, in step 510, the email client contacts the dynamic content management system to request the image. The dynamic content management system then loads the content source in step 520. When the content is returned in step 530, the image is returned to the email client in step 540. At this point, when streaming dynamic content to the email client, the connection is preferably left open in step 550. If the content from the content source changes, the updated content is obtained in step 560 by the dynamic content management system, and an updated image is returned to the email client in step 570. This process can be repeated as often as necessary as in steps 580 and 590.

Redirecting Links

If the email includes any links, the above techniques can be used to dynamically update those links, as needed, to allow automatic link re-routing after an email has been sent based on business rules or parsing a web page, for example. Link re-targeting or redirecting can be done by directing the links to be redirected to a redirect engine. The image server can then identify the corresponding links on the source web page it is capturing. The image server stores the corresponding links, and when the user clicks on a link in the email, the redirect engine obtains the most recent stored link, and forwards the user to the target of that link.

For example, if a product advertisement is displayed in the embedded image for a product that has limited availability (i.e. a private sale of a car), and the actual product is sold before a user clicks on the link associated with the product advertisement, the server can redirect the user to a comparable product rather than allow the user to be directed to the original destination for the product that is no longer available.

Links can also be inferred from dynamic web pages. For example, dynamically rendered web pages (e.g. HTML pages) can be parsed, and any underlying links can be used to determine any necessary changes regarding the links.

Scalability of Dynamic Content

As described herein, dynamic web content can be delivered and presented in emails in real-time and in a scalable way. For example, the updated content can be resized and arranged in a specific configuration within the email. For example, if the dynamic content for presentation is a Tweet, blog entry, status update, or the like, the email may include a specific subsection adapted to present that specific content. Thus, as updated instances of the content are obtained and presented in the email, the size and resolution of the elements, for example, can be adjusted to optimize the presentation of the updated content.

More specifically, images and other content can be cropped, distorted, or otherwise modified depending on the size of the content. Instead of having a fixed frame to crop the source web page, the dimensions of the portions of the source area being cropped can be adjusted based on the size of the desired elements on the source page. For example, social networks can be fairly slow when showing conversations in their emails. As messages are sent, the source web page itself gets longer, and the corresponding image size can be scaled or adjusted to adapt to the new image size. Other examples include cropping, resizing, deleting, partitioning and adjust the image.

Geo-Targeting

Furthermore, the disclosed technology supports the presentation of dynamic content based on advanced factors. For example, as emails are distributed world-wide, not all content will be relevant in all geographic areas. Targeting content based on the location of each user is an efficient and effective way to present relevant content to users. In this regard, mapping techniques such as geo-targeting can be used to identify the location of a user when an email is opened, and the techniques described herein can then be used to obtain updated dynamic content relevant to that location. The location of users can be determined based on IP address, GPS signals, or any other location indicator associated with any device accessing the email, such as computers, smartphones, tablets, etc. Specifically, when an email client of a user requests a dynamic image, location information (e.g. IP address) can be collected by the image server, and the location can be mapped to a latitude/longitude, for example. This information can then be stored and used to provide location-relevant information.

For example, if an advertiser sends an email to users located throughout the U.S., and there are offers that expire at midnight on a certain day, etc., emails in the respective time-zones can be updated to reflect the expiration of that offer when they are opened. As another example, clothing advertisements, for example, can be catered and presented to specific users in different climates. For example, during the winter, a user in Florida would likely not benefit from offers related to snow equipment, and like-wise, a user in Canada would not need advertisements for water sports. By presenting content dynamically based on location of the user when the email is opened, offers can be optimized.

Furthermore, it would not be necessary to cater advertisement for specific users based on their user profiles, for example, their registered home addresses or zip codes, and instead, the content can be adjusted by their actual locations when the emails themselves are opened. For example, suppose a user lives in New York, but spends their winters in Florida. Using traditional methods, a sporting goods company, for example, may target that user with advertisements relative to their assumed location of New York. However, by using the techniques described herein would present geographically relevant content at whatever location the user was at the time the email was opened. Additionally, if the user opened the email first in New York, and then again in Florida, the content would be updated to reflect the change in location.

Geo-targeting can also be used to display local maps corresponding to the area in which the user is located. In this manner, if an email is promoting a retail outlet, for example, the local map could be used to display all retail outlets in the vicinity of the user. Any points of interest in the local map can also be displayed.

Device Detection

When a user opens or refreshes an email, a dynamic image is requested from the image server. When this occurs, the user device or email client typically sends information about the device the user is using to view the email. This information can include, for example, a string that uniquely identifies the name and version of the email client. For instance, an exemplary string may be: Mozilla/5.0 (iPhone; U; CPU iPhone OS 4_3_3 like Mac OS X; en-us) AppleWebKit/533.17.9 (KHTML, like Gecko) Version/5.0.2 Mobile/8J2 Safari/6533.18.5. This string indicates that the user has opened the device on an iPhone, running IOS 4.3.3. This information can be stored and used to ensure that the dynamic image that is returned is optimal for the user's device. Thus, content specific to the device can be provided.

Mobile Targeting

As introduced above with regard to device detection, mobile targeting refers to the optimizing the email's image for display on a mobile device, such as a smartphone or tablet. Specifically, the image to be presented on a mobile device may be different than the image displayed on a full browser, and can include a variety of distinguishing characteristics, such as a simpler call to action, lower resolution images, bigger text, an advertisement corresponding to the mobile device, and the like.

Using Device/Location Information

As described herein, the capture server loads dynamic web pages and renders them for use in emails. Often, it is useful for the dynamic web page to know details about the user, such as their device/location information. In order to pass this information along, when the capture server loads the dynamic web page, location and device information can be appended as query parameters in the web page's URL, for example, as shown below: http://mysite.com/mypage?mi_lat=40.23948&mi_lon=-72.38405&mi_type=mobile)

Parameters can be have a preamble such as "mi_" in order to not produce collisions with other query parameters the dynamic page may already be using for other purposes. Thus, when the dynamic web page is generated, the query parameters can be used to modify the dynamic content. For instance, if the "mi_type" parameter is included, the dynamic content can be optimized for display on a mobile phone and a larger text can be used.

Syndication

Dynamic content can also be syndicated from one provider or advertiser to unrelated publishers or email servers using the location or other data associated with users. For example, when a company is sending out emails to their own list of users, they can often get targeting demographic data such as the location of their users. However, if the company then has their content inserted in another company's email, they may no longer receive the location data. The disclosed technology allows the company to obtain this information.

Creative Optimization

The disclosed technology can also be used to test and provide feedback on variations in content distribution strategies. For example, is there are five different versions of an images being used in an email campaign, each can be monitored for its effectiveness, and the usage of the most effective version can be increased over time, thereby optimizing the performance of the email campaign. This "on-the-fly" optimization allows advertisers to identify and present the best performing promotions or other content. In addition to optimizing the email templates to include specific aspects of the dynamic content based on performance, the entire email template can be optimized using the same technique.

Breaking News & Tweets

The disclosed technology can also be used to present dynamic content such as breaking news, tweets, blog entries, and other updates. Content such as breaking news and Tweets can be displayed via a dynamic image, in subsections within the email template, or can be displayed using a scrolling section, and the like.

Time-Based Promotions

The disclosed technology can also be used to present dynamic content including a timer, such as a count-down timer indicating when a particular offer will expire. Expiring coupons can be used to dynamically count-down when the email is opened to create a sense of urgency, for example. The disclosed technology can further restrict access to link (e.g. redirect the user elsewhere when they click) after the coupon expires. Thus, even is an offer expires, the link is not wasted.

Social Offers

Social offers include offers that are associated with other users that an email recipient is connected with via, for example, social networks. Social offers can also utilize other social cues to identify potentially associated users, such as users who read the same email, users who have similar browsing histories, or share similar internet interests shown by the fact that they visited the same or related website or clicked on the same or similar offers, users who liked the same or similar brands, users who bought the same or similar products, and the like. Using this information, social offers can include offers for products or services that one or more users associated with the email recipient (e.g. the email recipient's "friends," people the email recipient follows, people who follow the email recipient, and the like) has taken advantage of. By alerting the email recipient to the interest of associated users, the email recipient may be more likely to also accept the offer.

Events, RSVPs, and Comments

The disclosed technology can also be used to present and monitor upcoming events or other social invitations. The types of dynamic content that can be used in this instance include, for example, updates to the event information, comment streams related to the event, and updated RSVP data in real-time.

Inventory Filtering

The disclosed technology can also be used to present dynamic content that indicates whether a particular item is in stock. It could also be used to show inventory location, updated inventory numbers and calculated future inventory estimates. This "zero inventory" feature can be used to verify and filter out-of-stock items to ensure full utilization of the real-estate within the email. Preferably, the available inventory can be displayed via a source website. In the alternative, the inventory can be hosted by the system according to the disclosed technology, for example, via an API or a feed stream from the source website. That is, the image server can communicate with a site that calculates inventory. If an item or service associated with the dynamic content is no longer available (e.g. sold out), the image server can instead cause display of comparable product/service in an email and re-direct any access attempts to the shown comparable or alternative item or service.

Dynamic Data Collection

Other types of data that can be collected using the systems disclosed herein include information regarding the user's access to each email such as how long the user keeps the email open (i.e. read length), whether the user opens the email multiple times, how many times the user clicks on links within the email, whether the email is forwarded, whether the email is printed, and the like. Regarding these features, data can be collected every time the user carries out an action on the email, such as opening, clicking, closing, forwarding, printing, etc., and can also be collected anytime new content is provided to the email client. The data can then be analyzed to determine the effectiveness of the email and the content presented therein. As a result, the most effective elements from each email campaign can be identified over time and optimally utilized. Furthermore, the data can be used to provide analytics to any content provider. Analytics can be utilized by content providers for many different purposes, such as facilitating and tracking payments, etc.

Figure 6:
FIG. 6 illustrates an email including traditional static content.

To illustrate the above described concepts, FIG. 6 illustrates an email 600 including traditional static content. Specifically, FIG. 6 shows an image 610 of an advertisement. The "daily deal" 620 that is being offered is "$8 For A $15 Gift Card." If the user wants to take advantage of the offer, they can attempt to do so by following any links, etc. embedded in the email. However, there is no guarantee that the offer will still be valid despite the fact that it is displayed in the email.

Figures 7A, 7B, 7C:
FIGS. 7A-E illustrate sections from an exemplary "daily deal" email including dynamic real-time content according to the disclosed technology.

In contrast, FIGS. 7A-E illustrate sections from an exemplary "daily deal" email including dynamic real-time content as disclosed herein. FIG. 7A shows that the presented offer 705 is for "$40 to Spend on Food and Drink" at Riverview for a price 710 of $20. FIG. 7A also shows a link 715 that the user can click on to "BUY NOW." FIG. 7B shows updated inventory and time left sections for the "daily deal" that create a sense of urgency by showing the number of items that are left or the time left in the deal. Specifically, FIG. 7B shows a time counter 720 of how many users have taken advantage of the deal, and time left section 725 displays how much time is left for the deal. A progress bar 718 also indicates how long until the deal expires. FIG. 7C illustrates an example section of details concerning a deal section 730 that can be used to describe the deal or any other information, and also shows a "LEARN MORE" link 735 that can be clicked by users to provide even more details.

Figure 7D:
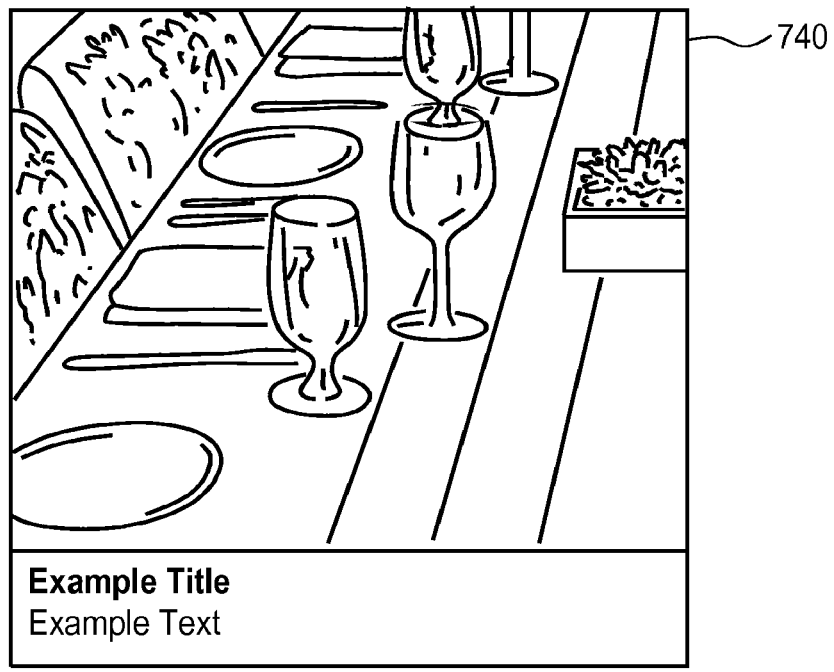
Figure 7E:
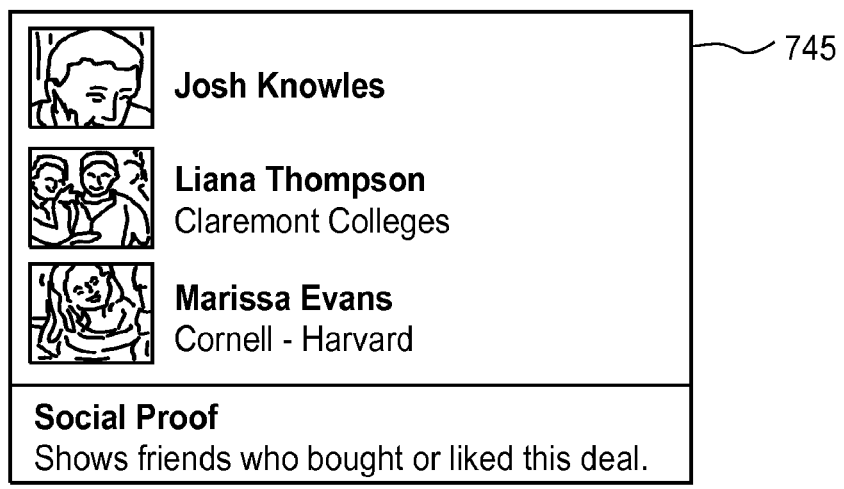

FIG. 7D shows an image 740 that can be creatively optimized. For example, different images can be displayed in different versions of the email template, and the dynamic content management system can determine which is the most effective and adjust which image 740 is presented accordingly. In this example, the example text is below the image. The Title is above the body of the text, and so on. These features can all be creatively optimized and changed. FIG. 7E shows a section 745 that displays information about other users (e.g. friends) that have taken advantage of the offer. This social proof can encourage users to also take advantage of the offer.

Figure 8A:
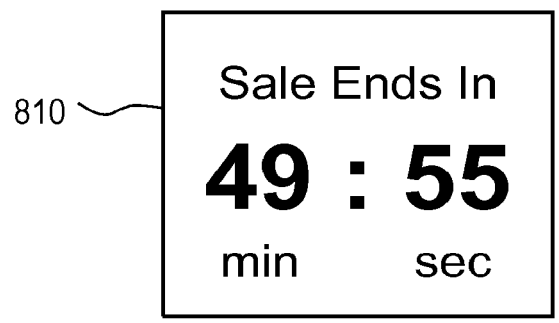
FIGS. 8A-8E illustrate sections from an exemplary "private sale" email including dynamic real-time content according to the disclosed technology.
Figure 8B:
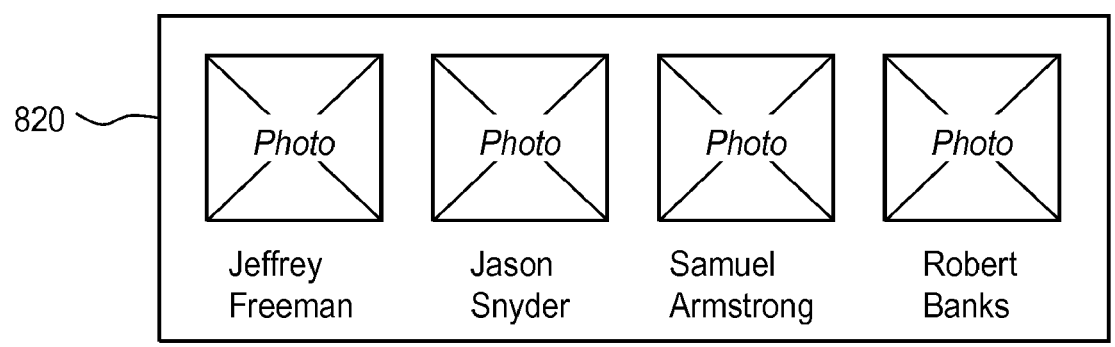
Figure 8C:
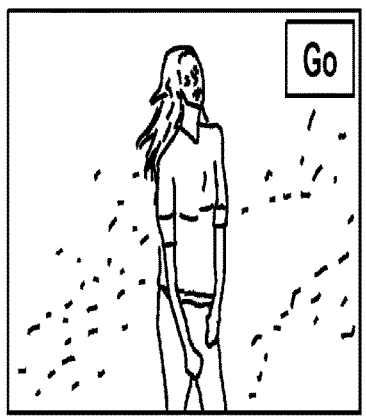
Figure 8C:
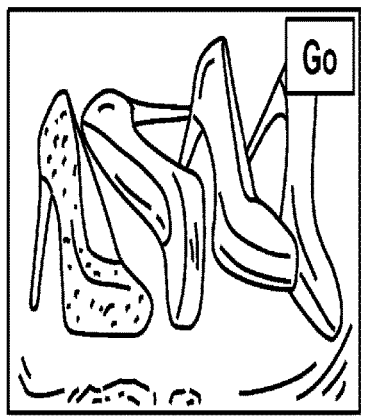
Figure 8C:
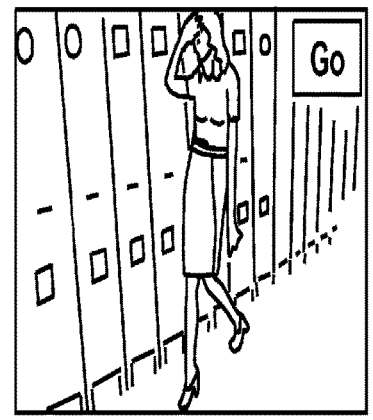
Figure 8D:
Figure 8E:
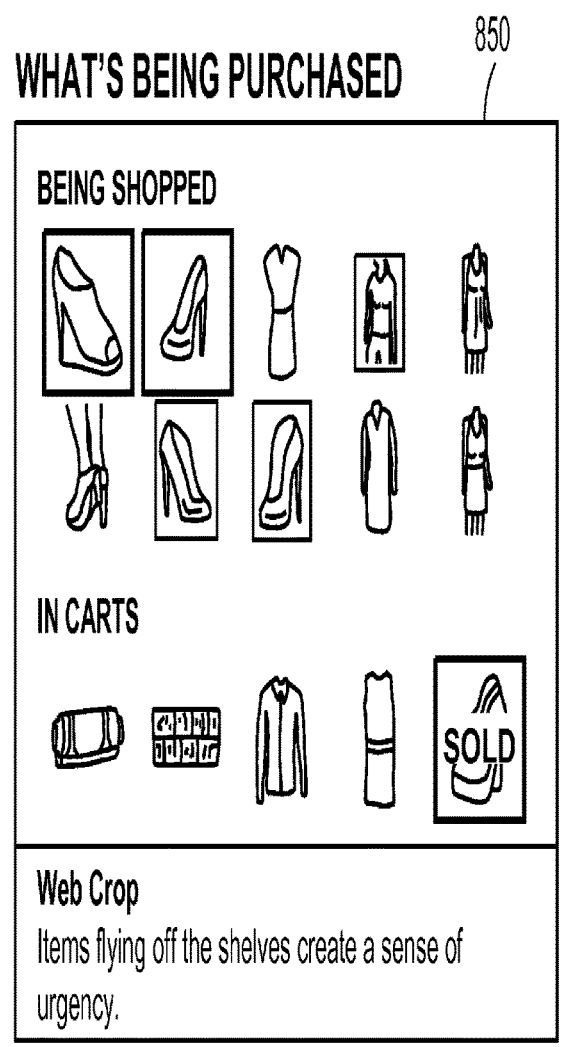

FIGS. 8A-8E illustrate sections from an exemplary "private sale" email including dynamic real-time content as disclosed herein. FIG. 8A shows a countdown timer 810 reflecting how much time is left in the offer. (i.e. "SALE ENDS IN 49:55"). FIG. 8B shows a social proof section 820 including information about friends or other users that are browsing or buying from the store. FIG. 8C shows content associated with the brands 830A-C included in the offer. FIG. 8D shows a web cropping 840 of a map showing where users are taking advantage of the offer across the country. FIG. 8E shows a web cropping 850 of items that are being purchased (i.e. items flying off the shelves.).

Figure 9A:
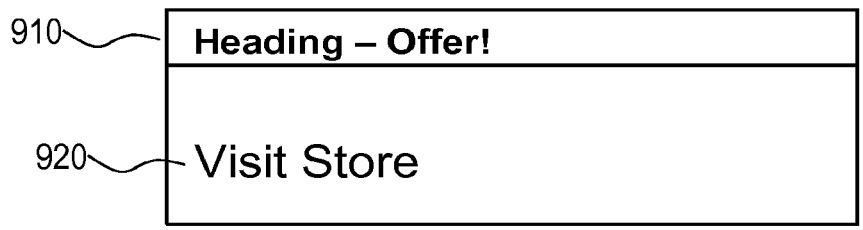
FIGS. 9A-9G illustrate sections from an exemplary "retail" email including dynamic real-time content according to the disclosed technology.
Figure 9B:
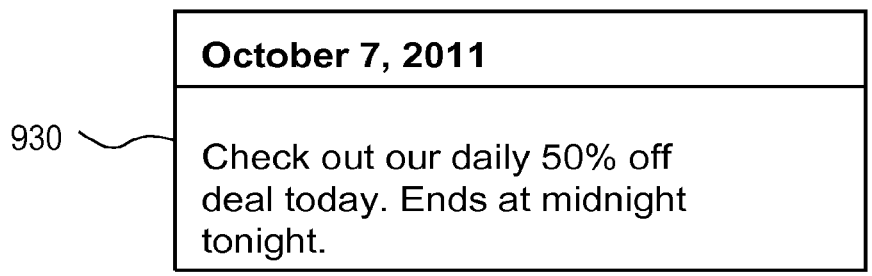
Figure 9C:
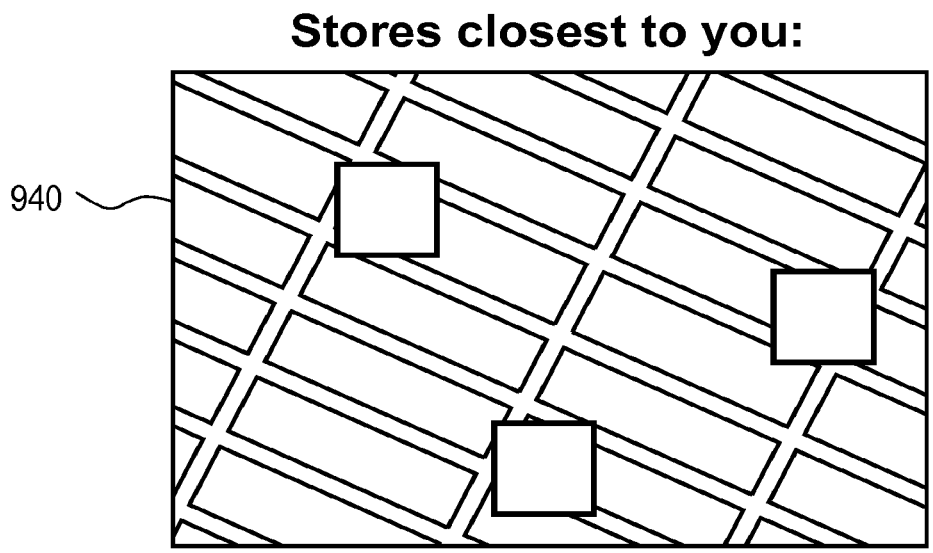
Figure 9D:
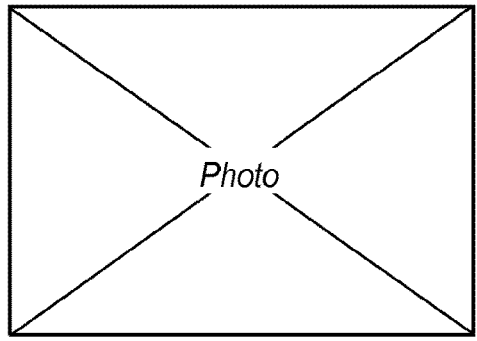
Figure 9E:
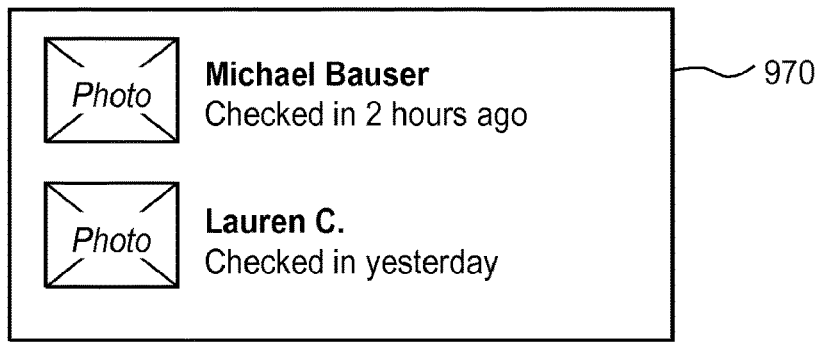
Figure 9G:
Figure 9F:

FIGS. 9A-9G illustrate sections from an exemplary "retail" email including dynamic real-time content as disclosed herein. FIG. 9A shows a header section 910 introducing the offer, and a link 920 allowing users to access the store website. FIG. 9B shows a web cropping 930 that displays offers from a local retail store, preferably, the nearest store to the email recipient. FIG. 9C shows a local map 940 of the retail outlets closest to the user/email recipient. FIG. 9D shows information about items or services 950 that are offered for sale, and also includes an updated or real-time inventory section 960, which shows how many of each item are in stock at the nearest store, for example. FIG. 9E shows a social proof section 970 including information about friends or other users that have recently accessed the offer. FIG. 9F shows an offer 980 from the retail store, such as an offer for Free Shipping when a price threshold is exceeded. Finally, FIG. 9G shows a section with a countdown time 990 associated with a special offer that has a limited time (e.g. "Only 6 hours left!").

Figure 10A:
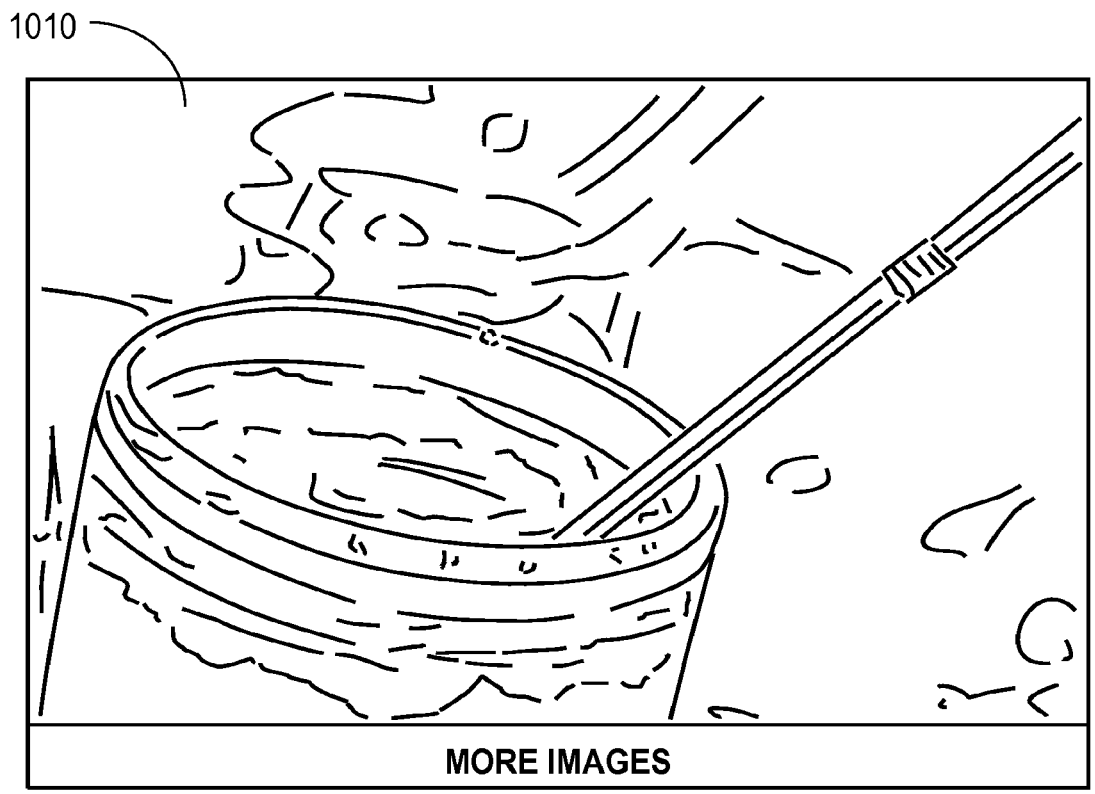
FIGS. 10A-D illustrate an exemplary email newsletter including dynamic sections according to the disclosed technology.
Figure 10B:
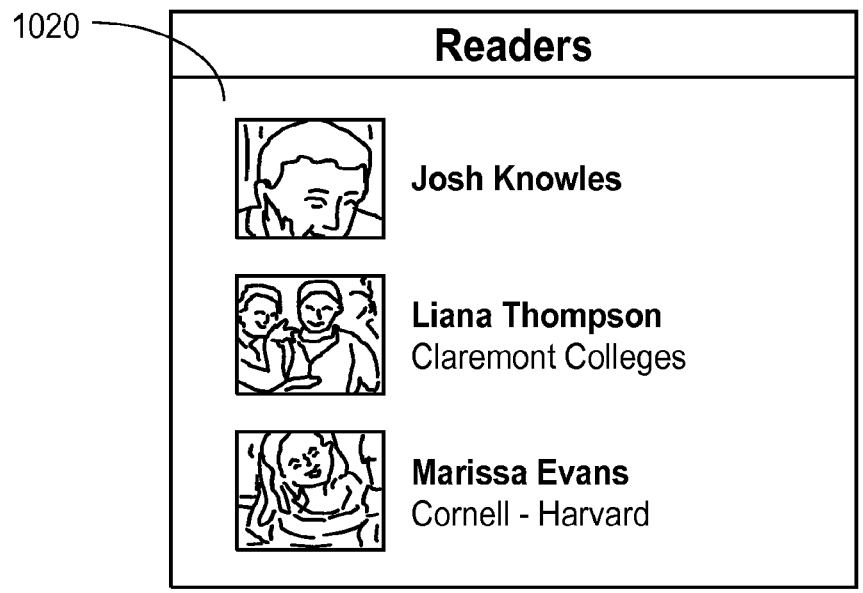
Figure 10C:
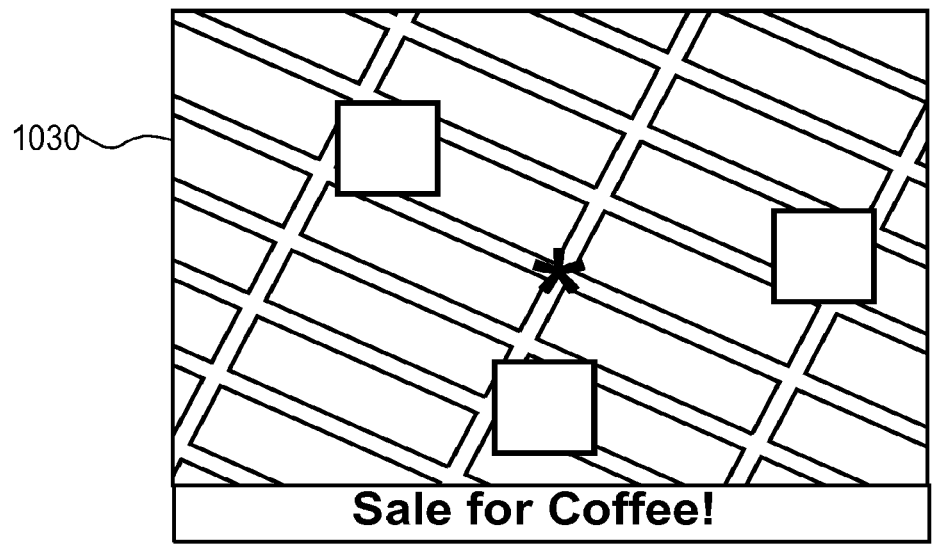
Figure 10D:
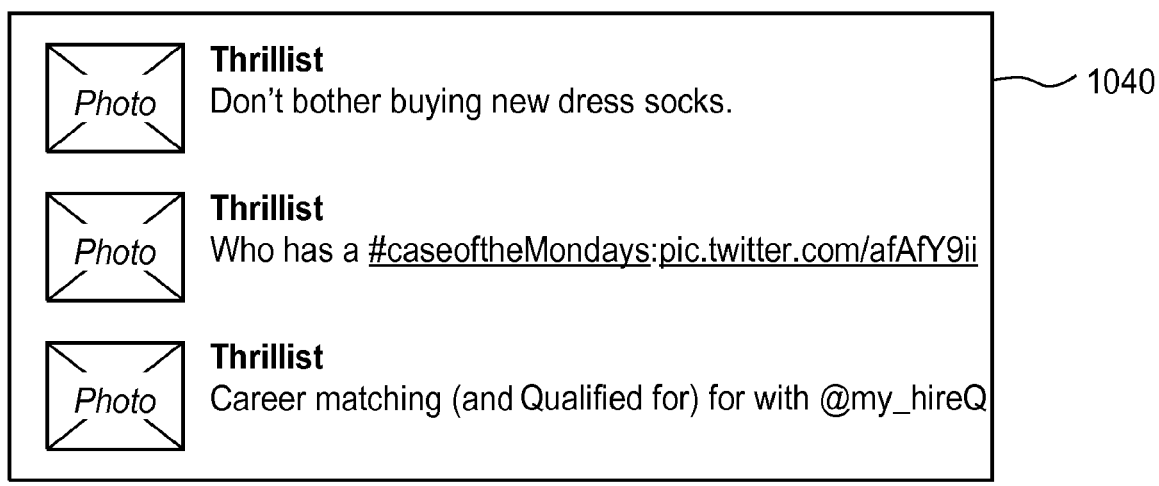

FIGS. 10A-D illustrate sections of an exemplary email newsletter. As shown in FIG. 10A, the email includes an image variations section 1010 that presents an image selected as a result of a testing various images within a campaign. FIG. 10B shows a social proof section 1020 that includes content relevant to the user to verify the validity or popularity of the offer, for example, a listing of people associated with the user that have viewed or taken advantage of the offer, such as social network "friends," etc. FIG. 10C shows geo-targeting section 1030 that includes a local map based on the location of the user. For each reader in a different geographical location, the displayed map may be different, as each map is selected based on the location of each user/email recipient. The local map can be used to plot the locations of retailers, etc. that are offering the advertised deal, for example. FIG. 10D shows breaking news section 1040 that includes dynamic content such as breaking news, tweets, or other updates.

Figure 11A:
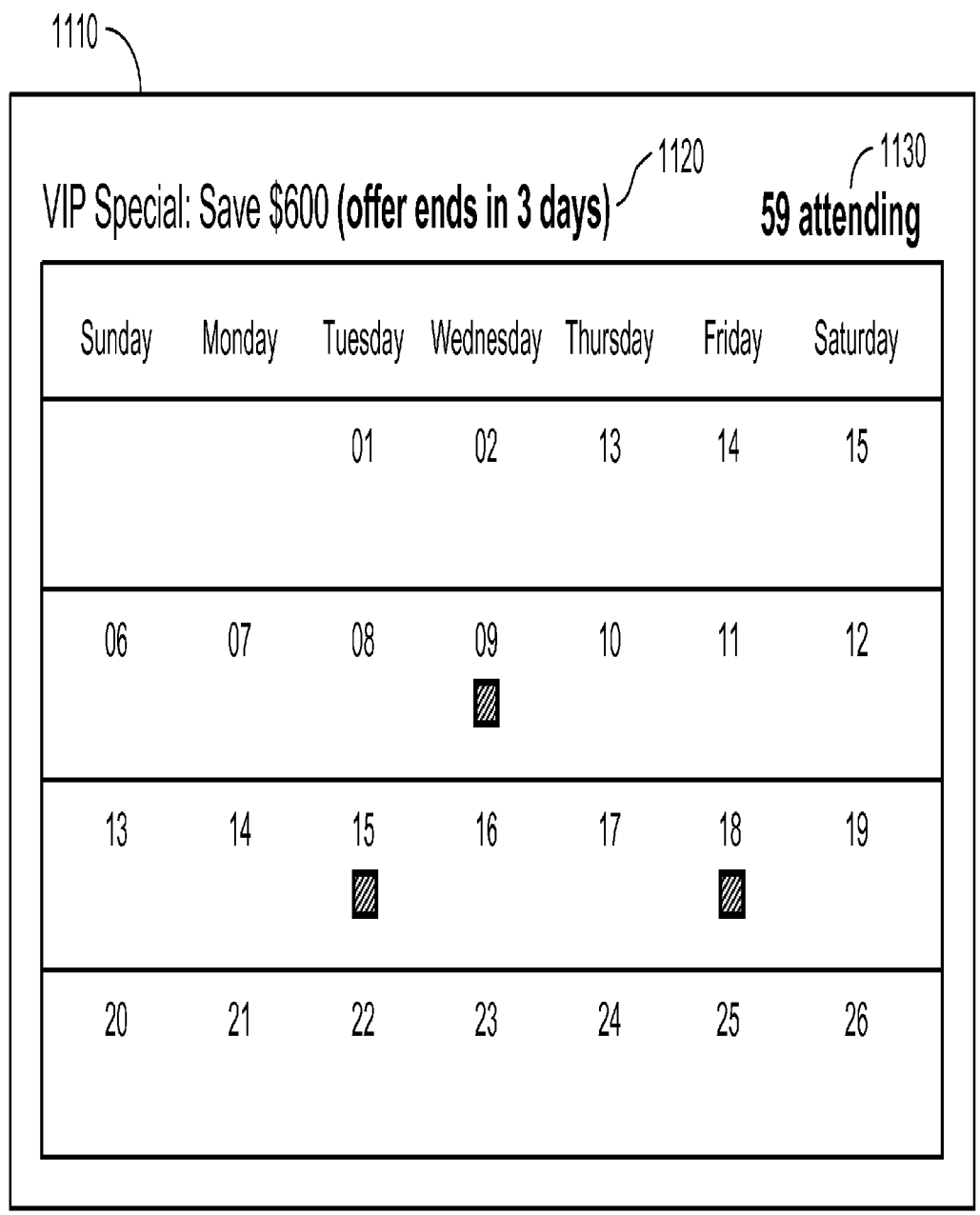
FIGS. 11A-C illustrate an email relevant to an "event" according to the disclosed technology.
Figure 11B:
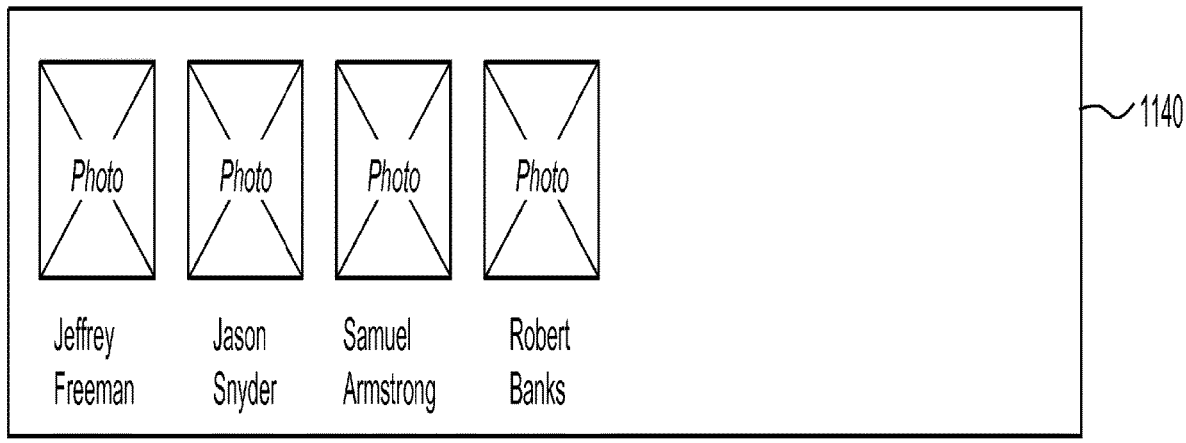
Figure 11B:
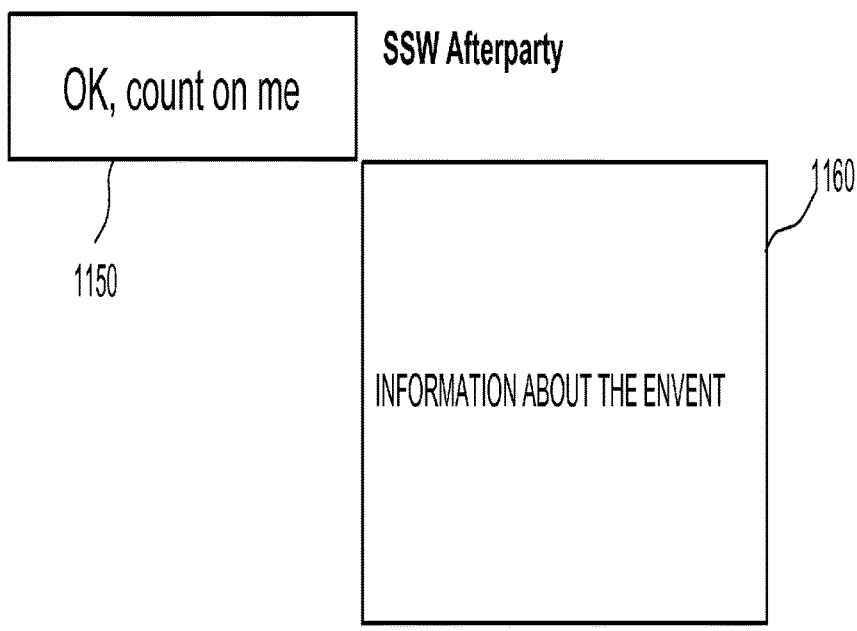
Figure 11C:
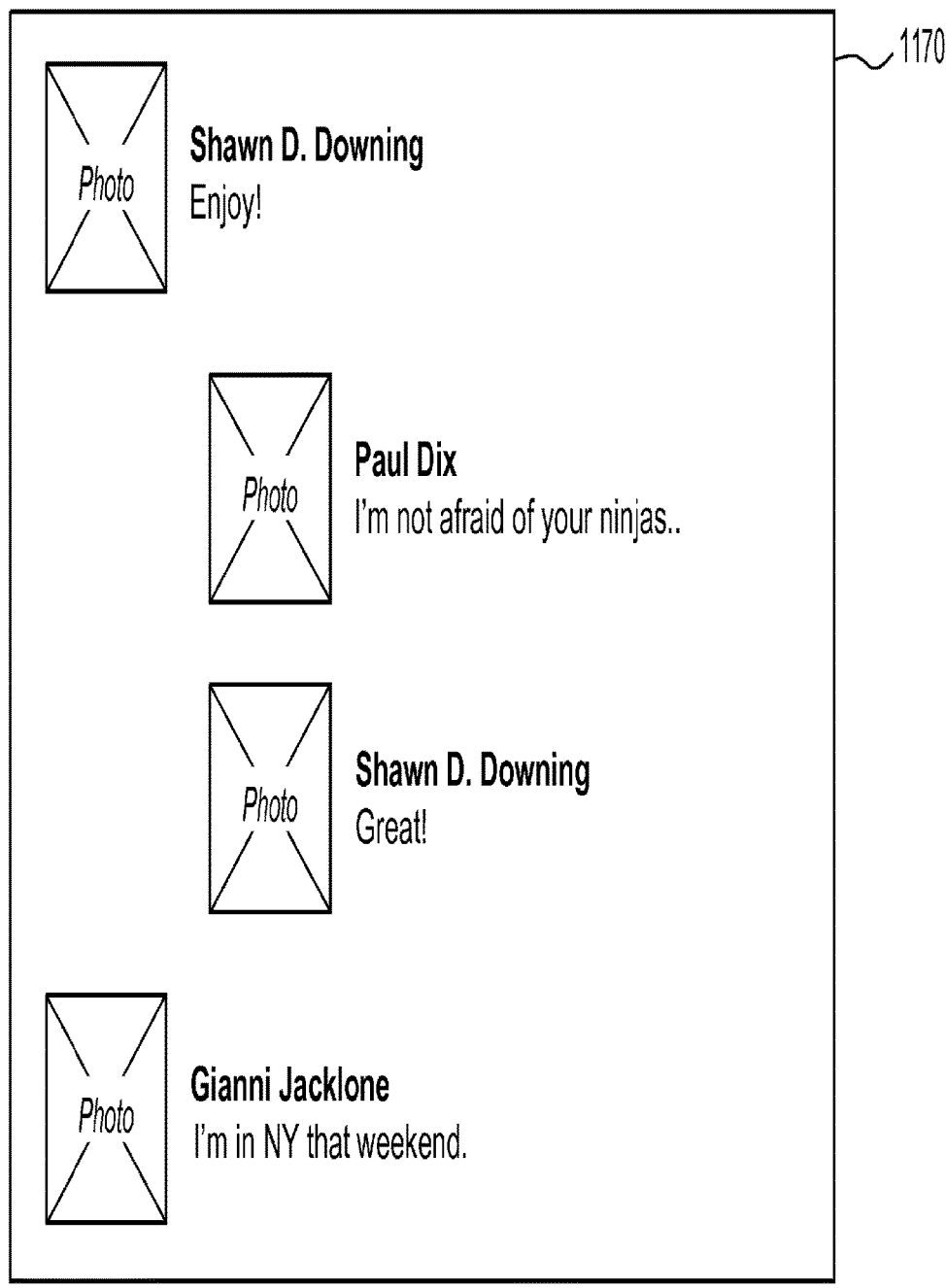

FIGS. 11A-C illustrate an email relevant to an "event" 1110. Dynamic content can be particularly useful in this scenario as the email can be used to update the event information on the fly. FIG. 11A includes an offer section 1120 showing an offer associated with the event (i.e. "VIP Special . . . "). RSVP section 1130 shows a counter of the number of people attending so far. FIG. 11B includes a social proof section 1140 showing friends and other users that are attending. Acceptance section 1150 provides an "OK, count on me!" link and information 1160 related to an associated event, such as an after-party. FIG. 11C shows a comments section 1170 which displays comments from other users.

Figures 12A, 12B:
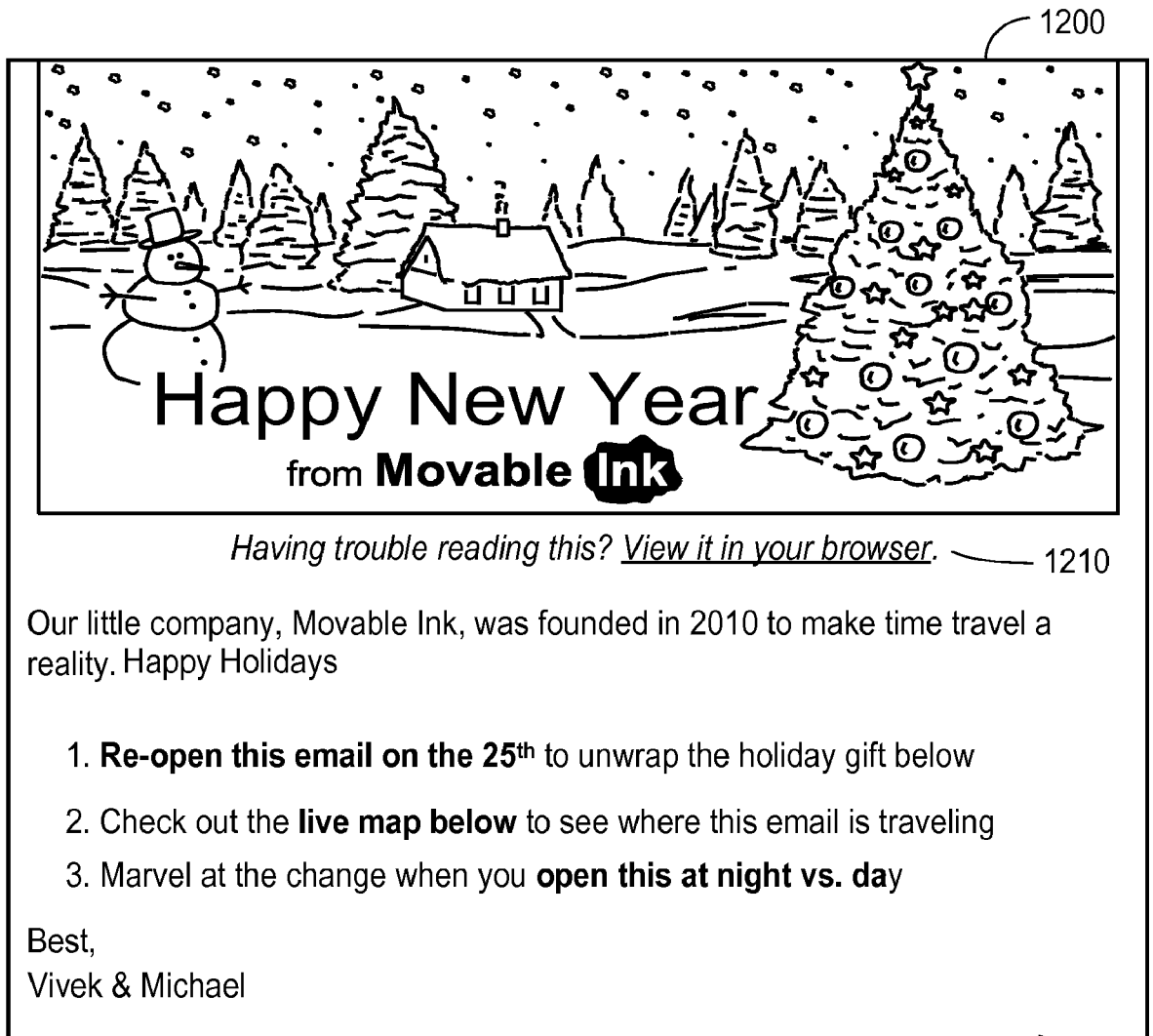
FIGS. 12A-E illustrate an email relevant to a "holiday card" according to the disclosed technology.
Figure 12C:
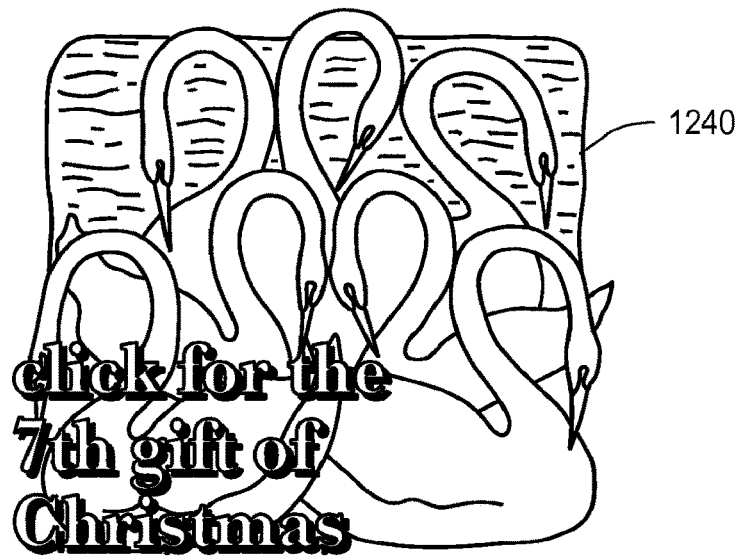
Figure 12D:
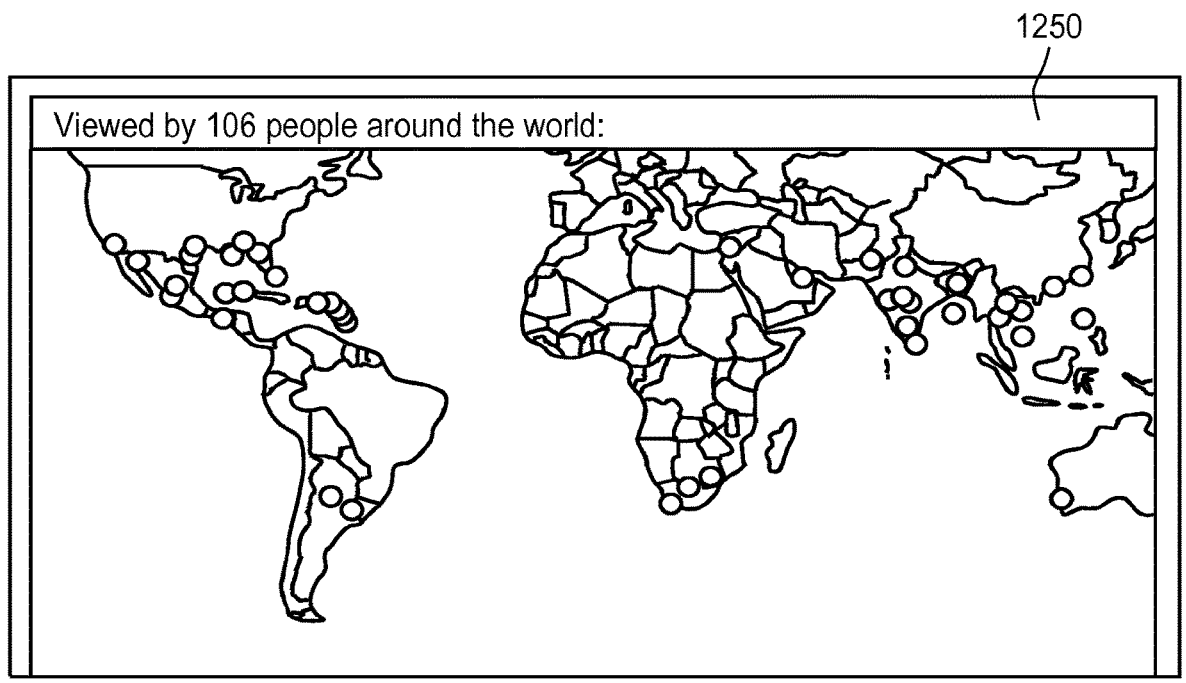
Figure 12E:
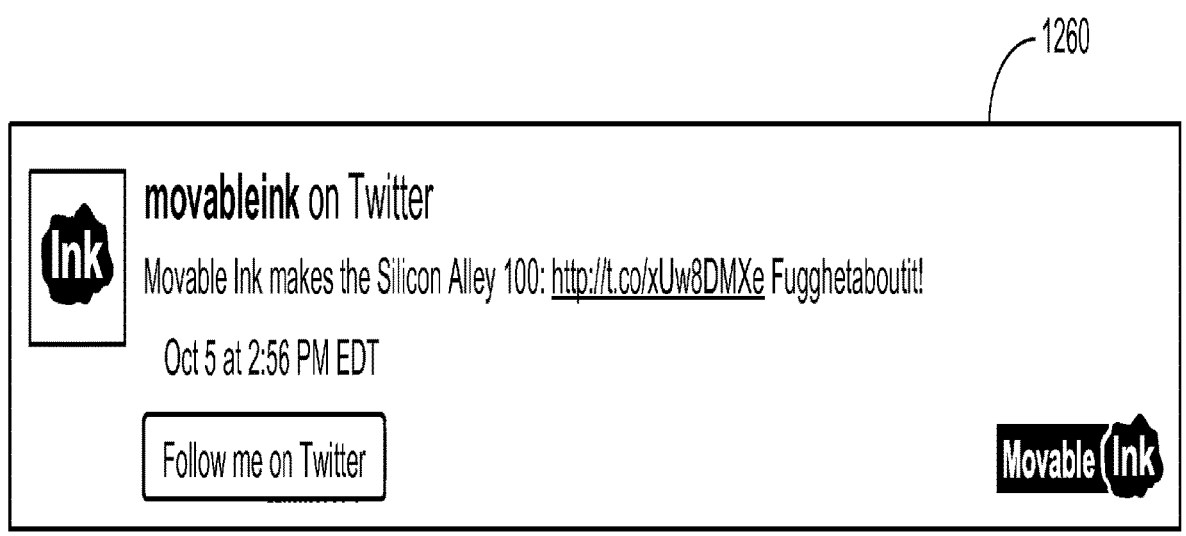

FIGS. 12A-E illustrate an email relevant to a "holiday card" 1200. FIG. 12A shows a link 1210 that allows a user to view the card in a browser, and information section 1220 describing the card or other details. FIG. 12B includes a countdown time 1230 showing how many days until a holiday, such as New Years. FIG. 12C shows a web cropping 1240 associated with a daily gift. FIG. 12D shows an engagement map section 1250 showing where the email has been opened all over the world. FIG. 12E shows a live tweets section 1260 that keeps the user up to date with tweets and/or social networking information.

Figure 13:
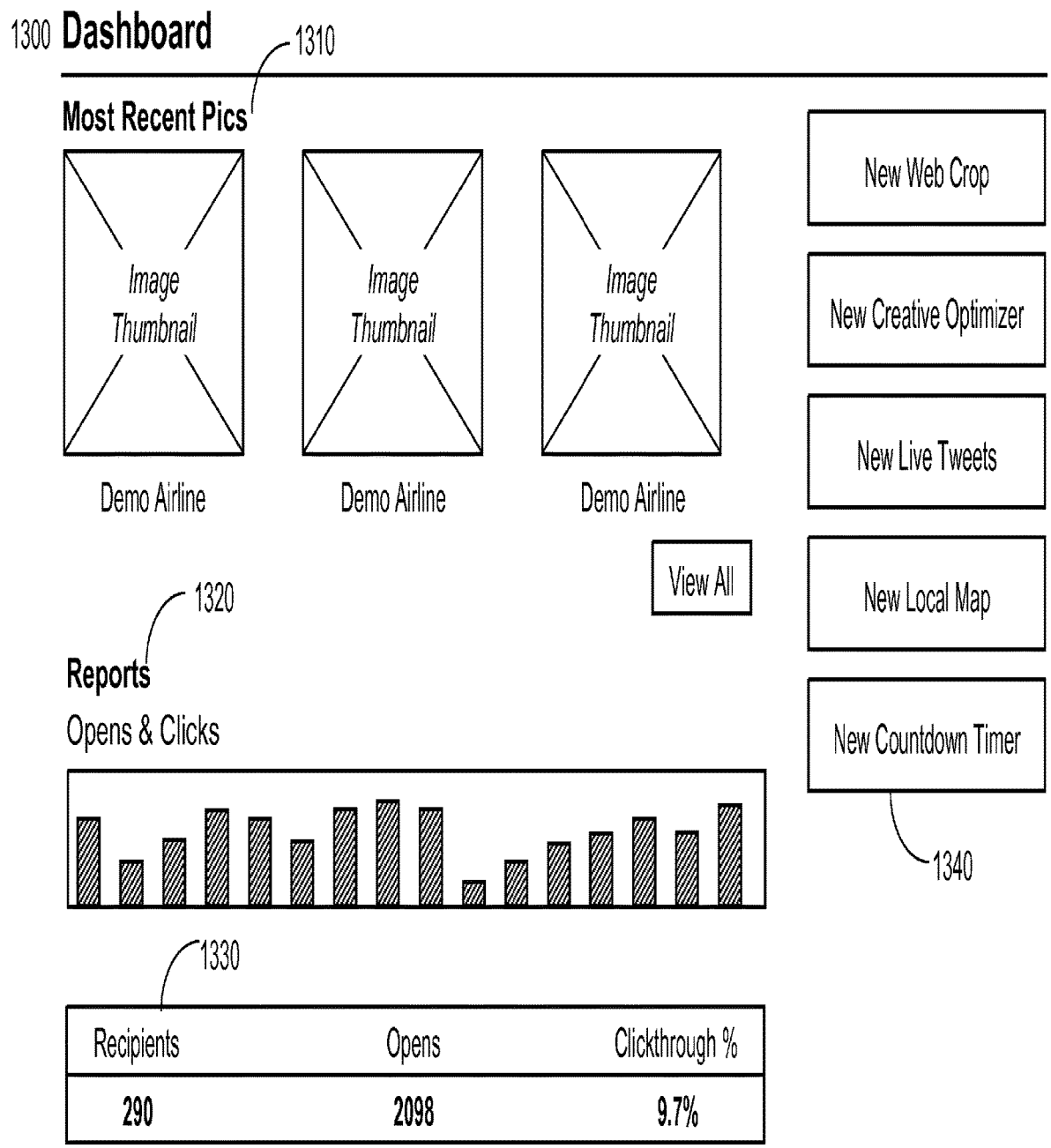
FIG. 13 illustrates an exemplary dashboard according to the disclosed technology.

FIG. 13 illustrates an exemplary dashboard 1300 according to the disclosed technology. Exemplary dashboards include interfaces allowing for configurations of the various features of the disclosed technology, such as configuring the types of dynamic content for presentation, whether advanced features such as geo-targeting should be utilized, what types of data collection is desirable, whether location information should be sent, whether adjustments should be made based on device-type, etc. Using the dashboard, clients can create new assets and set properties on them, review analytics and prepare related reports, monitor and manage the applications, and the like. Users can also utilize a cropping tool, for example, to associate a specific portion of a web page to be displayed in the email, and associate that portion with a URL, for example.

Some exemplary features shown in FIG. 13 include, for example, a "Most Recent Pics" section 1310 which shows assets that the client has created most recently, a "Reports" section 1320 which sets forth a variety of reports, such as a "Opens and Clicks" report, which is a timeline of opens and clicks during the current billing period to help clients see at a glance how much traffic they are getting, and a "Detailed" report, 1330 which shows opens, visitors, and clickthroughs on recently created assets. Dashboard 1300 can also include links 1340 which allow the user to activate new features and the like.

Applications Gallery

The disclosed technology further relates to a user interface that displays a wide variety of applications that can be used to configure and embed many different types of dynamic content into email templates. This user interface, which is also referred to as an applications gallery, may include applications from any source, including $3^{rd}$-party applications, such as Twitter, Facebook, Gmail, and the like. When an application is selected for use in an email template, the selected application can be further configured, as needed, using a user interface. Links or icons representative of similar applications or other application that may be of interest to the user may also be displayed in the user interface.

Computer System Overview

Figure 14:
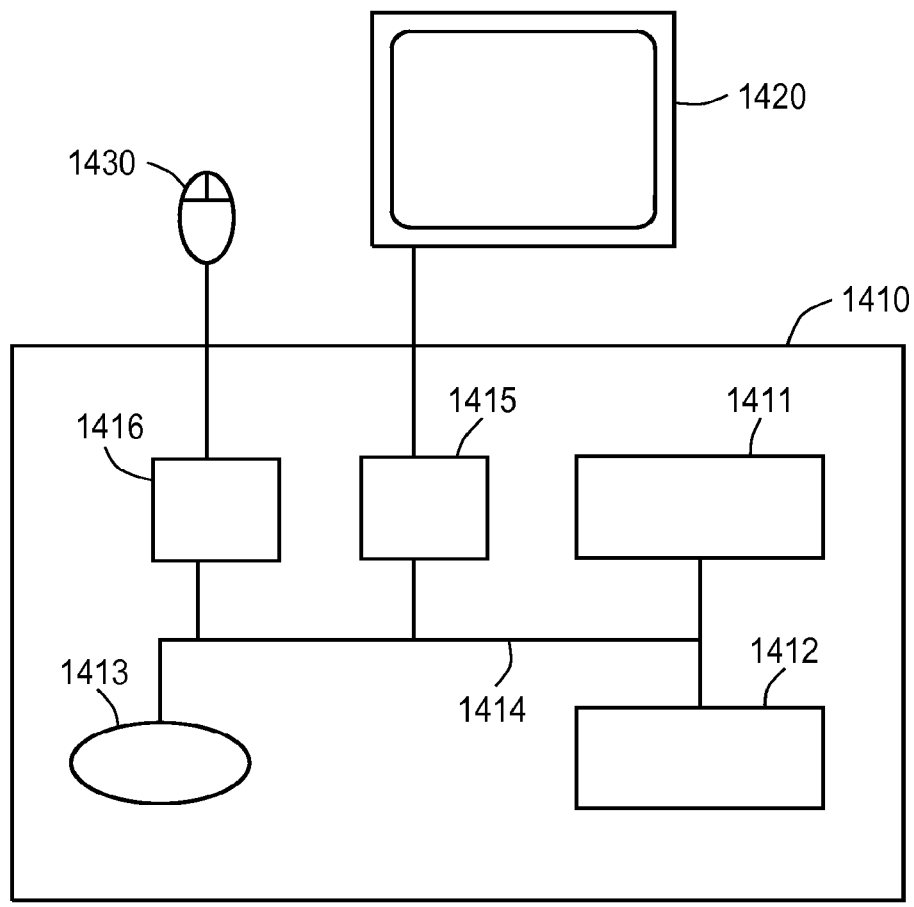
FIG. 14 illustrates an exemplary computer system according to the disclosed technology.

The technology described herein may be implemented with software, for example modules executed on computing devices such as computing device 1410 of FIG. 14. Embodiments of the disclosed technology may, for example, execute modules to implement the systems and methods disclosed herein. Of course, a single step may be performed by more than one module, a single module may perform more than one step, or any other logical division of various steps disclosed herein may be used to implement the processes as software executed on a computing device.

Example computing device 1410 has one or more processing device 1411 designed to process instructions, for example computer readable instructions (i.e., code) stored on a storage device 1413. Storage device 1413 may be any type of storage device (e.g., an optical storage device, a magnetic storage device, a solid state storage device, etc.), for example a non-transitory storage device. Alternatively, instructions may be stored in remote storage devices, for example storage devices accessed over a network or the Internet. Computing device 1410 additionally has memory 1412, an input controller 1416, and an output controller 1415. A bus 1414 operatively couples components of computing device 1410, including processor 1411, memory 1412, storage device 1413, input controller 1416, output controller 1415, and any other devices (e.g., network controllers, sound controllers, etc.). Output controller 1415 may be operatively coupled (e.g., via a wired or wireless connection) to a display device 1420 (e.g., a monitor, television, mobile device screen, touch-display, etc.) in such a fashion that output controller 1415 can transform the display on display device 1420 (e.g., in response to modules executed). Input controller 1416 may be operatively coupled (e.g., via a wired or wireless connection) to input device 1430 (e.g., mouse, keyboard, touch-pad, scroll-ball, touch-display, etc.) in such a fashion that input can be received from a user.

FIG. 14 illustrates an example computing device 1410, display device 1420, and input device 1430 as separate devices for ease of identification only. Computing device 1410, display device 1420, and input device 1430 may be separate devices (e.g., a personal computer connected by wires to a monitor and mouse), may be integrated in a single device (e.g., a mobile device with a touch-display, such as a smart phone or a tablet), or any combination of devices (e.g., a computing device operatively coupled to a touch-screen display device, a plurality of computing devices attached to a single display device and input device, etc.). Computing device 1410 may be one or more servers, for example a farm of networked servers, a clustered server environment, or a cloud network of computing devices.

As disclosed herein, features consistent with the present inventions may be implemented via computer-hardware, software and/or firmware. For example, the systems and methods disclosed herein may be embodied in various forms including, for example, a data processor, such as a computer that also includes a database, digital electronic circuitry, firmware, software, computer networks, servers, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

We claim:

1. A method of managing dynamic content comprising:
   by an image server with a processor and memory, receiving a request from at least one email client for dynamic content, when an email is opened or refreshed;
   by the image server, in response to receiving the request, loading first data regarding the at least one email client from a data storage, wherein the first data regarding the at least one email client includes one or more of geo-location data and a type of a device used by the user to access the email;
   by the image server, loading second data regarding the requested dynamic content from at least one asset database, including a location of a source of the requested dynamic content;
   by the image server, deciding, based on the loaded first and second data, a HyperText Markup Language (.html) web page content source for the requested dynamic content;
   by the image server, sending to a capture server with a processor and memory, a request for the requested dynamic content;
   by the capture server, receiving the request for the dynamic content;
   by the capture server, loading at least a portion of the web page content source;

by the capture server, parsing the content source into structured form;

by the capture server, applying the structured content to a template using a local web page and a What You See Is What You Get (WYSIWYG) editor;

by the capture server, locating at least one link in the captured portion of the web page content source;

by the capture server, mapping a location of the at least one link in the captured portion of the web page content source;

by the capture server, sending the captured portion of the web page content source to the image server and the mapped locations of the at least one link;

by the image server, receiving the captured portion of the web page content source and the mapped locations of the at least one link;

by the image server, inserting the captured portion of the web page content into an email; and by the image server, providing the requested, modified, dynamic content to the at least one email client.

2. The method of claim 1 further comprising, by the asset database, causing storage of information regarding, kind of images used, rules to apply, and location where dynamic content is located.

3. The method of claim 1 further comprising, by a redirect server, in communication with the image server:

receiving the links and the mapped locations of the links; and in response to a user selection of one of the links, redirecting a browser of the user to a corresponding web page.

4. The method of claim 1 further comprising, by the image server:

updating the dynamic content displayed in the email when the dynamic content at the content source changes, via a connection held open between the image server and the at least one email client.

5. The method of claim 1, wherein the at least a portion of a web page comprises streaming content.

6. The method of claim 1 further comprising, by the capture server:

changing at least one image in the captured portion of the web page content source and returning the modified image to the image server.

7. The method of claim 6, wherein changing includes at least one of: crop image and distort image.

8. The method of claim 1 further comprising, by the image server:

receiving information regarding a device used to open the email.

9. A non-transitory, computer-readable media with instructions for a method of managing dynamic content comprising:

by an image server with a processor and memory, receiving a request from at least one email client for dynamic content, when an email is opened or refreshed;

by the image server, in response to receiving the request, loading first data regarding the at least one email client from a data storage, wherein the first data regarding the at least one email client includes one or more of geo-location data and a type of a device used by the user to access the email;

by the image server, loading second data regarding the requested dynamic content from at least one asset database, including a location of a source of the requested dynamic content;

by the image server, deciding, based on the loaded first and second data, a HyperText Markup Language (.html) web page content source for the requested dynamic content;

by the image server, sending to a capture server with a processor and memory, a request for the requested dynamic content;

by the capture server, receiving the request for the dynamic content;

by the capture server, loading at least a portion of the web page content source;

by the capture server, parsing the content source into structured form;

by the capture server, applying the structured content to a template using a local web page and a What You See Is What You Get (WYSIWYG) editor;

by the capture server, locating at least one link in the captured portion of the web page content source;

by the capture server, mapping a location of the at least one link in the captured portion of the web page content source;

by the capture server, sending the captured portion of the web page content source to the image server and the mapped locations of the at least one link;

by the image server, receiving the captured portion of the web page content source and the mapped locations of the at least one link;

by the image server, inserting the captured portion of the web page content into an email; and by the image server, providing the requested, modified, dynamic content to the at least one email client.

10. The non-transitory, computer-readable media of claim 9 further comprising, by the asset database, causing storage of information regarding, kind of images used, rules to apply, and location where dynamic content is located.

11. The non-transitory, computer-readable media of claim 9 further comprising, by a redirect server, in communication with the image server:

receiving the links and the mapped locations of the links; and in response to a user selection of one of the links, redirecting a browser of the user to a corresponding web page.

12. The non-transitory, computer-readable media of claim 9 further comprising, by the image server:

updating the dynamic content displayed in the email when the dynamic content at the content source changes, via a connection held open between the image server and the at least one email client.

13. The non-transitory, computer-readable media of claim 9 wherein the at least a portion of a web page comprises streaming content.

14. The non-transitory, computer-readable media of claim 9 further comprising, by the capture server:

changing at least one image in the captured portion of the web page content source and returning the modified image to the image server.

15. The non-transitory, computer-readable media of claim 14 wherein changing includes at least one of: crop image and distort image.

16. A system for managing dynamic content comprising:

an image server with a processor and memory, configured to receive a request from at least one email client for dynamic content, when an email is opened or refreshed;

the image server further configured to, in response to receiving the request, load first data regarding the at least one email client from a data storage, wherein the first data regarding the at least one email client includes one or more of geo-location data and a type of a device used by the user to access the email;

the image server further configured to, load second data regarding the requested dynamic content from at least one asset database, including a location of a source of the requested dynamic content;

the image server further configured to, decide, based on the loaded first and second data, a HyperText Markup Language (.html) web page content source for the requested dynamic content;

the image server further configured to, send to a capture server with a processor and memory, a request for the requested dynamic content;

the capture server configured to, receive the request for the dynamic content;

the capture server further configured to, load at least a portion of the web page content source;

the capture server further configured to, parse the content source into structured form;

the capture server further configured to, apply the structured content to a template using a local web page and a What You See Is What You Get (WYSIWYG) editor;

the capture server further configured to, locate at least one link in the captured portion of the web page content source;

the capture server further configured to, map a location of the at least one link in the captured portion of the web page content source;

the capture server further configured to, send the captured portion of the web page content source to the image server and the mapped locations of the at least one link;

the image server further configured to, receive the captured portion of the web page content source and the mapped locations of the at least one link;

the image server further configured to, insert the captured portion of the web page content into an email; and the image server further configured to, provide the requested, modified, dynamic content to the at least one email client.

17. The system of claim 16 wherein the asset database is further configured to, cause storage of information regarding, kind of images used, rules to apply, and location where dynamic content is located.

18. The system of claim 16 further comprising a redirect server, in communication with the image server, configured to:

receive the links and the mapped locations of the links; and in response to a user selection of one of the links, redirect a browser of the user to a corresponding web page.

19. The system of claim 16 wherein the capture server is further configured to:

change at least one image in the captured portion of the web page content source and returning the modified image to the image server.

20. The method of claim 19, wherein changing includes at least one of: crop image and distort image.

* * * * *